US009401786B2

(12) United States Patent
Kawasaki et al.

(10) Patent No.: US 9,401,786 B2
(45) Date of Patent: Jul. 26, 2016

(54) WIRELESS STATION, DATA TRANSMISSION METHOD, AND WIRELESS COMMUNICATION SYSTEM

(71) Applicant: FUJITSU LIMITED, Kawasaki-shi, Kanagawa (JP)

(72) Inventors: Takeshi Kawasaki, Kawasaki (JP); Yuji Kojima, Kawasaki (JP); Masato Okuda, Tokorozawa (JP)

(73) Assignee: FUJITSU LIMITED, Kawasaki (JP)

( * ) Notice: Subject to any disclaimer, the term of this patent is extended or adjusted under 35 U.S.C. 154(b) by 75 days.

(21) Appl. No.: 14/275,673

(22) Filed: May 12, 2014

(65) Prior Publication Data

US 2014/0341127 A1 Nov. 20, 2014

(30) Foreign Application Priority Data

May 14, 2013 (JP) .................................. 2013-102292

(51) Int. Cl.
- *H04W 40/02* (2009.01)
- *H04L 5/00* (2006.01)
- *H04L 1/22* (2006.01)

(52) U.S. Cl.
CPC ................ *H04L 5/0044* (2013.01); *H04L 1/22* (2013.01); *H04L 5/006* (2013.01); *H04L 5/0064* (2013.01); *H04L 5/0007* (2013.01); *H04L 5/0023* (2013.01)

(58) Field of Classification Search
USPC .................................. 370/329; 455/450–453
See application file for complete search history.

(56) References Cited

U.S. PATENT DOCUMENTS

| 6,483,820 | B1* | 11/2002 | Davidson | H04W 28/16 370/329 |
| 6,788,943 | B1* | 9/2004 | Hamalainen | H04W 16/04 455/435.3 |
| 6,859,842 | B1* | 2/2005 | Nakamichi | H04L 45/00 709/238 |
| 2006/0126577 | A1* | 6/2006 | Yano | H04W 36/0088 370/337 |
| 2006/0135191 | A1* | 6/2006 | Matsui | H04B 17/309 455/515 |
| 2008/0102845 | A1* | 5/2008 | Zhao | H04W 72/085 455/450 |

(Continued)

FOREIGN PATENT DOCUMENTS

| CN | 102340875 A | * 2/2012 | ............ H04W 72/04 |
| JP | 2008-085759 A | 4/2008 | |

(Continued)

*Primary Examiner* — Edan Orgad
*Assistant Examiner* — Sithu Ko
(74) *Attorney, Agent, or Firm* — Arent Fox LLP

(57) ABSTRACT

A wireless station includes: a transmitter configured to transmit data to a terminal device by at least one of a first wireless communication method using a reserved first wireless resource, the first wireless communication method using a reserved second wireless resource being a different frequency band from the first wireless resource, and a second wireless communication method; and a processor coupled to the transmitter and configured to: perform transmission of the data by the first wireless communication method using the first wireless resource prioritized over at least one of the first wireless communication method using the second wireless resource and the second wireless communication method, and perform, when the remaining first wireless resource has become less than or equal to a first threshold value, transmission of the data by the at least one of the first wireless communication method using the second wireless resource and the second wireless communication method.

14 Claims, 25 Drawing Sheets

(56) References Cited

U.S. PATENT DOCUMENTS

| | | | | |
|---|---|---|---|---|
| 2008/0137534 A1* | 6/2008 | Chilukoor | H04L 47/266 | 370/232 |
| 2010/0240386 A1* | 9/2010 | Hamabe | H04W 72/085 | 455/452.2 |
| 2010/0246401 A1* | 9/2010 | Woundy | H04L 12/2801 | 370/236 |
| 2010/0248763 A1* | 9/2010 | Aaron | H04W 28/22 | 455/509 |
| 2010/0331034 A1* | 12/2010 | Ishii | H04W 48/18 | 455/517 |
| 2011/0222505 A1* | 9/2011 | Li | H04L 27/2601 | 370/330 |
| 2012/0231829 A1* | 9/2012 | Guo | H04W 72/04 | 455/509 |
| 2012/0236953 A1* | 9/2012 | Mueck | H04W 88/085 | 375/260 |
| 2013/0078925 A1* | 3/2013 | Aguirre | H04W 4/021 | 455/62 |
| 2013/0094446 A1* | 4/2013 | Swaminathan | H04W 36/0022 | 370/328 |
| 2013/0095845 A1* | 4/2013 | Lim | H04W 36/0066 | 455/452.2 |
| 2013/0201961 A1* | 8/2013 | Lee | H04W 48/18 | 370/331 |
| 2013/0210447 A1* | 8/2013 | Moe | H04W 72/0486 | 455/453 |
| 2014/0023013 A1* | 1/2014 | Lee | H04W 28/24 | 370/329 |
| 2014/0024282 A1* | 1/2014 | Lin | A63H 33/28 | 446/15 |
| 2014/0213256 A1* | 7/2014 | Meylan | H04W 48/18 | 455/436 |
| 2014/0341109 A1* | 11/2014 | Cartmell | H04L 45/308 | 370/328 |
| 2015/0173044 A1* | 6/2015 | Rinne | H04W 76/022 | 370/254 |

FOREIGN PATENT DOCUMENTS

| | | |
|---|---|---|
| JP | 2010-109824 A | 5/2010 |
| JP | 2012-015793 A | 1/2012 |
| JP | 2012-134817 A | 7/2012 |

* cited by examiner

WIRELESS STATION, DATA TRANSMISSION METHOD, AND WIRELESS COMMUNICATION SYSTEM

CROSS-REFERENCE TO RELATED APPLICATION

This application is based upon and claims the benefit of priority of the prior Japanese Patent Application No. 2013-102292, filed on May 14, 2013, the entire contents of which are incorporated herein by reference.

FIELD

The embodiments discussed herein are related to a wireless station, a data transmission method, and a wireless communication system.

BACKGROUND

Currently, wireless communication systems such as a mobile phone system and a wireless local area network (LAN) are widely used. In addition, in the field of wireless communication, next-generation communication technologies are being continuously discussed in order to further improve a communication speed and a communication capacity. For example, in 3rd Generation Partnership Project (3GPP) serving as a standardization body, the standardization of a communication standard such as Long Term Evolution (LTE) or LTE-Advance (LTE-A) based on the LTE has been completed or is being studied.

In recent years, it has become possible for terminal devices such as smartphones to perform wireless communication using a plurality of wireless communication methods (or wireless media) including a public line network such as a mobile phone network, a wireless local area network (LAN), and so forth. For example, the terminal device performs wireless communication using the public line network, and in a case where it is not possible to use the public line network, such as in an underground mall, it is also possible to perform wireless communication using the wireless LAN.

Also on a network side, a network called Heterogenous Network (HetNet) starts to garner attention. The HetNet is, for example, a network where cells of varied sizes, such as a macrocell, a picocell, and a microcell, are hierarchized. In the HetNet, using, for example, different wireless communication methods (the LTE and 3G or the like) or different frequency bands, wireless communication is performed. Since cells are hierarchized in the HetNet, it is possible to improve the capability (capacity) of an entire mobile communication system.

As techniques relating to such wireless communication, the following techniques are cited, for example. In other words, there is a communication control device adjusting the degree of congestion in a base station responding to each wireless communication method, based on the priority of a wireless communication method, given notice of by a communication terminal device, the degree of conformance calculated based on the index of each wireless communication method, and an estimated consumed resource. According to this technique, for example, a multimode terminal compatible with a plurality of wireless access methods is able to be adjusted so that a load is not concentrated on a base station of a specific access method.

In addition, there is also a wireless device that distributes packets with respect to three links accessing a base station using IEEE802.11a, IEEE802.11b, and IEEE802.11g so that the average delay times of the three links become even, and transmits the packets to the base station. According to this technique, for example, it is possible to improve a communication efficiency in a cognitive wireless network.

Furthermore, there is also a technique where a wireless communication device selects at least one wireless module different from one another, based on an estimated transmission rate and the estimated power consumption amount of a battery, the wireless communication device being applied to a heterogenous wireless communication system performing wireless communication using simultaneously various types of wireless communication method. According to this technique, for example, it is possible to efficiently utilize the battery of a terminal.

Furthermore, there is also a technique where, in a wireless base station including a plurality of wireless media such as a wireless LAN and Worldwide interoperability for Microwave Access (WiMAX), the distribution ratio of transmission frames is determined based on wireless information such as a received signal strength indicator (RSSI) acquired from each wireless module or a data amount waiting to be transmitted.

Techniques of the related art have been disclosed in Japanese Laid-open Patent Publication No. 2012-134817, Japanese Laid-open Patent Publication No. 2010-109824, Japanese Laid-open Patent Publication No. 2012-15793, and Japanese Laid-open Patent Publication No. 2008-85759.

SUMMARY

According to an aspect of the invention, a wireless station includes: a transmitter configured to transmit data to a terminal device by at least one of a first wireless communication method using a first wireless resource reserved for the wireless station, the first wireless communication method using a second wireless resource reserved for the wireless station and being a different frequency band from the first wireless resource, and a second wireless communication method; and a processor coupled to the transmitter and configured to: perform transmission of the data by the first wireless communication method using the first wireless resource prioritized over at least one of the first wireless communication method using the second wireless resource and the second wireless communication method, and perform, when the remaining first wireless resource has become less than or equal to a first threshold value, transmission of the data by the at least one of the first wireless communication method using the second wireless resource and the second wireless communication method.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
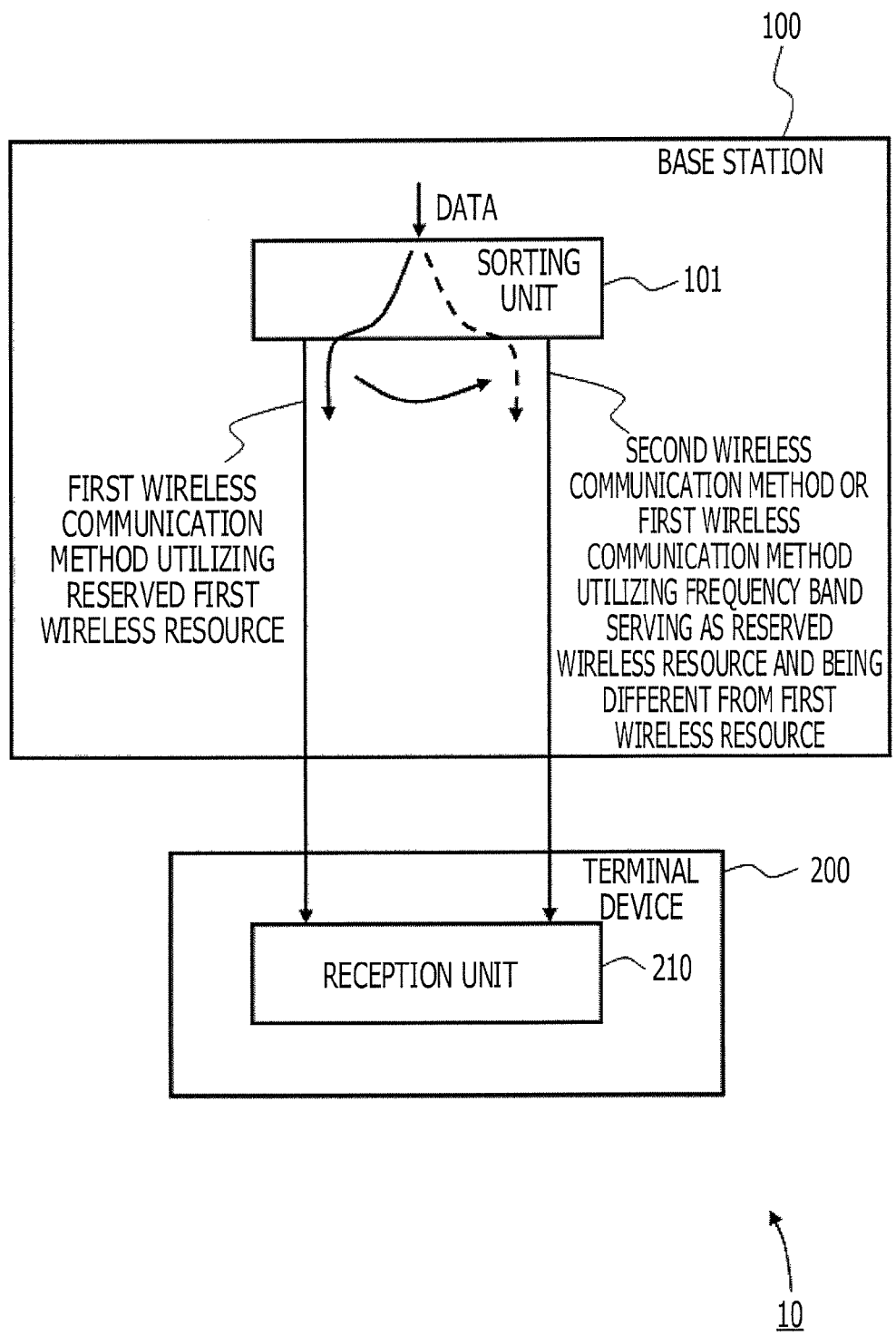
FIG. 1 is a diagram illustrating an example of a configuration of a wireless communication system.

Hereinafter, embodiments for implementing the present technology will be described.

While inventing the present embodiments, observations were made regarding a related art. Such observations include the following, for example.

A technique of the related art, such as the above-mentioned techniques, is a technique where one is selected from among various types of wireless communication method, based on, for example, an estimated consumed resource amount or the estimated power consumption amount of a battery. In such a technique, there is also a case in which the selected wireless communication method is not a method where a wireless resource is reserved and wireless communication is performed in such a way as, for example, the WiMAX but a wireless communication method where a wireless resource is shared with wireless communication performed by another base station. As an example of such a wireless communication method, for example, a wireless LAN or the like may be cited. The technique where the average delay times become even is, for example, a technique for transmitting packets with distributing the packets using various types of method based on such a wireless LAN.

If such a wireless communication method has been selected, a wireless resource is shared with, for example, wireless communication performed by another base station, and hence, retransmission is performed more than once in some cases. Therefore, in the technique where one is selected from among various types of wireless communication method, based on the estimated consumed resource amount or the estimated power consumption amount, in some cases it is difficult to improve a throughput.

In addition, in the technique where the distribution ratio of transmission frames is determined based on the wireless information, a wireless resource is shared with wireless communication performed by another base station, as for wireless communication based on, for example, a wireless LAN. Therefore, the assumed transmission amount of data on a wireless LAN side is not reserved. In such a case, if the transmission amount of data based on the wireless LAN has become reduced, the transmission amount of data based on the WiMAX also becomes reduced in accordance with the distribution ratio. If the transmission amount of data based on the WiMAX has become reduced, a margin corresponding to that amount also occurs in a wireless resource on a WiMAX side in some cases, and a wireless resource is not used for wireless communication, in some cases even though, for example, there is a margin in such a wireless resource on the WiMAX side. Accordingly, in the technique where the distribution ratio of transmission frames is determined based on the wireless information, the wireless resource is not effectively utilized, and in some case it is difficult to improve a throughput.

Furthermore, in the technique where the distribution ratio of transmission frames is determined based on the wireless information, for example, in a case where a communication quality fluctuates widely, an RSSI becomes different between the time of the measurement of the RSSI and the time of the transmission of data. For example, the RSSI at the time of the measurement is used for the distribution ratio, and the RSSI becomes a different RSSI at the time of the transmission of data. Therefore, it is difficult to secure a throughput requested at the time of the determination of the distribution ratio in some cases.

Therefore, the embodiments disclosed herein, for example, provide a wireless station, a data transmission method, and a wireless communication system, which improve a throughput.

In addition, the embodiments disclosed herein, for example, provide a wireless station, a data transmission method, and a wireless communication system, which are able to effectively utilize a wireless resource.

First Embodiment

First, a first embodiment will be described. FIG. 1 is a diagram illustrating an example of the configuration of a wireless communication system 10 in the first embodiment.

The wireless communication system 10 includes a base station (as an example of a wireless station) 100 and a terminal device 200.

The base station 100 transmits data to the terminal device 200, based on a first wireless communication method for performing wireless communication using a reserved first wireless resource. In addition, the base station 100 transmits data to the terminal device 200, based on a second wireless communication method or the first wireless communication method for performing wireless communication using a frequency band serving as a reserved wireless resource and being different from the first wireless resource.

The base station 100 includes a sorting unit 101. The sorting unit 101 prioritizes the first wireless communication method utilizing the first wireless resource over the second wireless communication method or the first wireless communication method utilizing the frequency band different from the first wireless resource, and transmits data to the terminal device 200, based on the prioritized first wireless communication method utilizing the first wireless resource. At this time, when the first wireless resource has become less than or equal to a first threshold value, the base station 100 transmits data to the terminal device 200, based on the second wireless communication method or the first wireless communication method utilizing the frequency band different from the first wireless resource.

On the other hand, the terminal device 200 includes a reception unit 210. The reception unit 210 receives the data transmitted from the base station 100.

In this way, in the base station 100, for example, the first wireless communication method utilizing the reserved first wireless resource is prioritized, and when the first free wireless resource has become less than or equal to the first threshold value, data is transmitted to the terminal device 200, based on the second wireless communication method. Accordingly, since, as for data difficult to transmit based on the reserved first wireless resource, the base station 100 transmits the data, based on the second wireless communication method, the base station 100 optimizes the use of both the first wireless resource and the wireless resource utilized in the second wireless communication method, and effectively utilizes the wireless resources.

In addition, since the base station 100 performs wireless communication with prioritizing the first wireless communication method utilizing the first wireless resource until, for example, the reserved first free wireless resource becomes less than or equal to the first threshold value, the base station 100 optimizes the use of the first wireless resource. Accordingly, the base station 100 is able to improve a throughput compared with a case where there is a margin in the first wireless resource, and also able to achieve the effective utilization of the reserved wireless resource.

Furthermore, in the base station 100, for example, the first wireless communication method utilizing the reserved first wireless resource is prioritized, and when the first free wireless resource has become less than or equal to the first threshold value, data is transmitted based on the first wireless communication method utilizing the frequency band different from the first wireless resource. Accordingly, for example, in a case where a communication quality between the base station 100 and the terminal device 200 fluctuates widely, the base station 100 is able to transmit data with prioritizing the first wireless communication method utilizing the first wireless resource of a good communication quality. Therefore, for example, even in a case where a communication quality is different between the time of the measurement of the communication quality and the time of data transmission, the base station 100 transmits data with prioritizing, for example, the first wireless communication method utilizing the first wireless resource superior in communication quality. Therefore, the base station 100 is also able to secure a throughput and achieve the improvement thereof.

Second Embodiment

Next, a second embodiment will be described. First, an example of the configuration of a communication network system in the present second embodiment will be described.

<Example of Configuration of Communication Network System 10>

Figure 2:
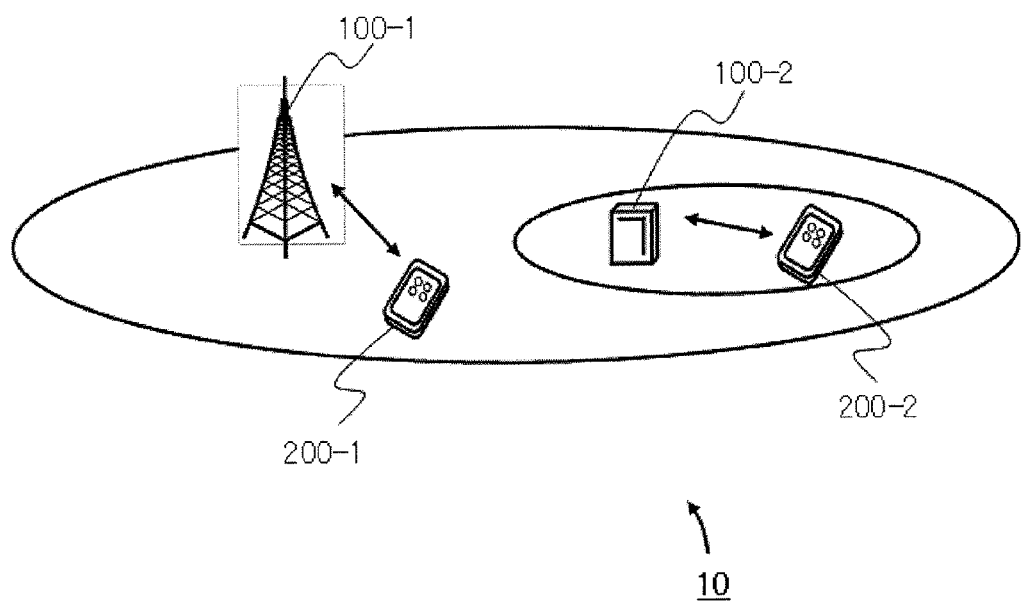
FIG. 2 is a diagram illustrating an example of a configuration of a wireless communication system.

FIG. 2 is a diagram illustrating an example of the configuration of a wireless communication system 10 in the second embodiment. The wireless communication system 10 includes base stations 100-1 and 100-2 and terminal devices (also referred to as terminals in some cases) 200-1 and 200-2.

The base stations 100-1 and 100-2 are, for example, wireless communication devices performing wireless communication with the terminals 200-1 and 200-2 in ranges capable of providing services (or cell ranges). In the example in FIG. 2, the base station 100-1 is a macro base station, the base station 100-2 is a femto base station, and the cell range of the base station 100-1 becomes larger than the cell range of the base station 100-2.

The femto base station 100-2 performs wireless communication with, for example, a registered user (for example, the terminal 200-2), and does not perform wireless communication with a non-registered user (for example, the terminal 200-1). In this regard, however, the femto base station 100-2 may also perform wireless communication with the terminal 200-2 under control thereof regardless of the presence or absence of registration, with taking into consideration a processing load or the like in the macro base station 100-1.

The base stations 100-1 and 100-2 are connected to, for example, devices such as another base station and a content distribution device via a network, and exchanges packet data or the like with these devices.

The terminals 200-1 and 200-2 are, for example, wireless communication devices performing wireless communication with the base stations 100-1 and 100-2. The terminals 200-1 and 200-2 are, for example, feature phones, smartphones, or the like. The example in FIG. 2 illustrates a situation where the terminal 200-1 and the terminal 200-2 perform wireless communication with the base station 100-1 and the base station 100-2, respectively.

In addition, the wireless communication system 10 illustrated in FIG. 1 is an example, and the number of the base stations 100-1 and 100-2 or the number of the terminals 200-1 and 200-2 may be one or plural. In addition, the kinds of the base stations 100-1 and 100-2 may also be other than those in FIG. 1. For example, in place of the femto base station, the base station 100-2 may also be a base station having a picocell whose cell range is smaller than the macrocell.

<Examples of Individual Configurations of Base Station and Terminal>

Figure 3:
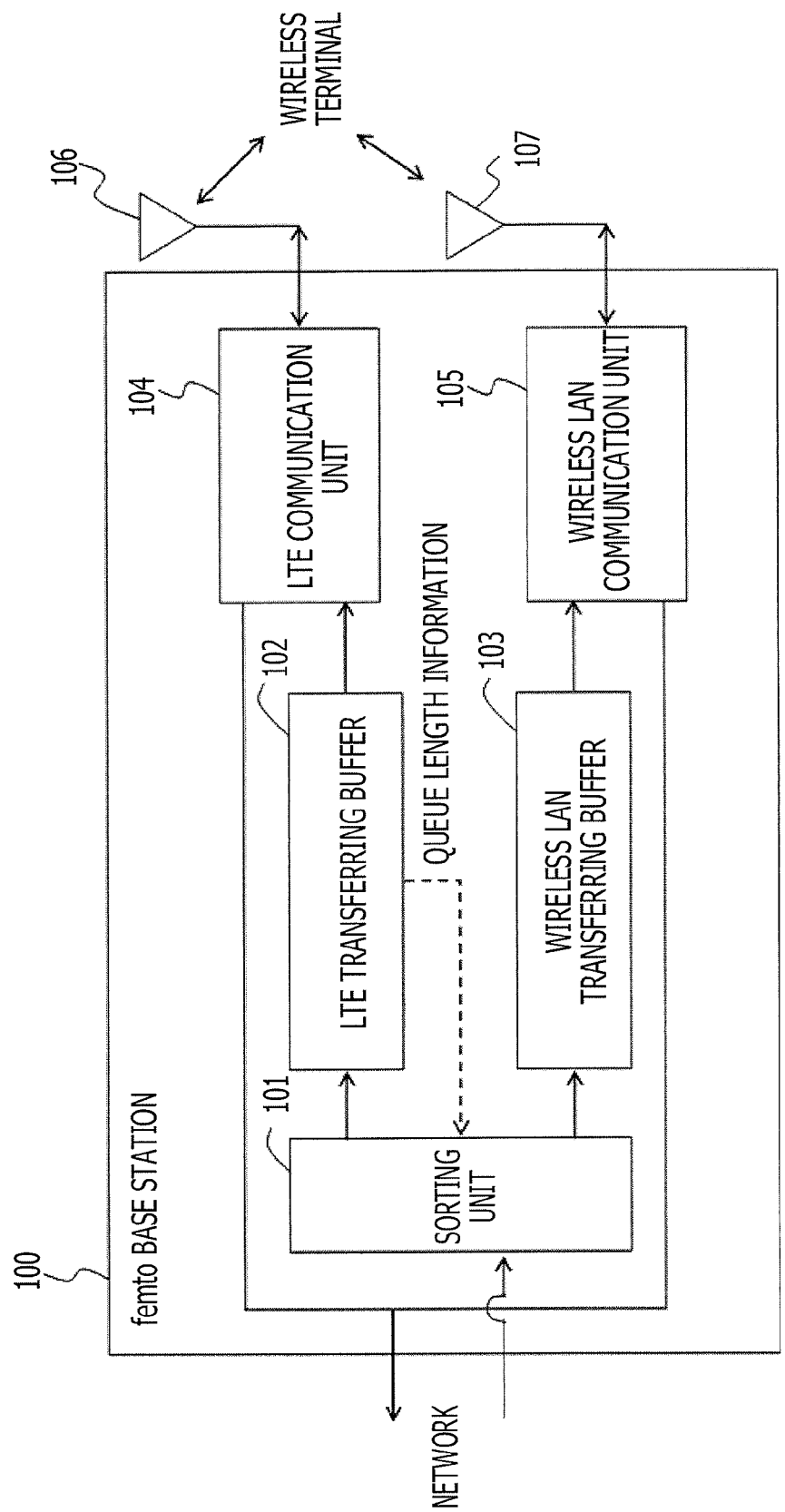
FIG. 3 is a diagram illustrating an example of a configuration of a base station.

FIG. 3 is a diagram illustrating an example of the configuration of the femto base station 100-2. In addition, in the embodiment illustrated below, the femto base station 100-2 has the same configuration as that of the macro base station 100-1, and will be described as a base station 100 unless otherwise noted. While the base station 100 in the present embodiment is also applicable in any of the femto base station 100-2 and the macro base station 100-1, the base station 100 is able to perform wireless communication based on a wireless LAN as illustrated in, for example, FIG. 3.

The base station 100 includes a sorting unit 101, an LTE transferring buffer 102, a wireless LAN transferring buffer 103, an LTE communication unit 104, a wireless LAN communication unit 105, and antennas 106 and 107.

The sorting unit 101 receives, for example, packet data transmitted from a network side, and sorts the received packet data into the LTE transferring buffer 102 on a priority basis. In this regard, however, based on, for example, queue length information output from the LTE transferring buffer 102, the sorting unit 101 switches sorting and sorts into the wireless LAN transferring buffer 103 in some cases. The detail of the sorting unit 101 will be described later.

The LTE transferring buffer 102 stores therein the packet data output from the sorting unit 101. The packet data stored in the LTE transferring buffer 102 is read out by the LTE communication unit 104, and transmitted using a wireless resource reserved by, for example, scheduling. As the wireless resource, for example, there are a frequency resource and a time resource, and one thereof or both thereof are used. The detail of the LTE transferring buffer 102 will be described later.

The LTE communication unit 104 reads out, from the LTE transferring buffer 102, packet data whose data amount corresponds to, for example, the wireless resource reserved by the scheduling, and converts the read packet data into a wireless signal conforming to a wireless communication method based on the LTE. For example, based on wireless quality information transmitted from the terminals 200-1 and 200-2, the LTE communication unit 104 determines an MCS, reserves a wireless resource by allocating a wireless resource suitable for the transmission of the packet data, and transmits the packet data.

By performing, for example, error correction encoding processing, modulation processing, frequency conversion processing to a frequency band, and so forth on the packet data, the LTE communication unit 104 converts the packet data into the wireless signal. The LTE communication unit 104 may also include an error correction encoding circuit, a modulation circuit, a frequency conversion circuit, and so forth so as to perform such conversion.

In addition, the LTE communication unit 104 receives a wireless signal output from an antenna 106, and extracts packet data from the wireless signal. Also in this case, using, for example, a wireless resource reserved by the scheduling, the LTE communication unit 104 receives wireless signals transmitted from individual users (or the terminals 200-1 and 200-2).

In addition, the LTE is an example of a wireless communication method for performing the transmission/reception of packet data using, for example, a wireless resource reserved by the scheduling or the like.

By performing, for example, frequency conversion processing to a baseband bandwidth, demodulation processing, error correction decoding processing, and so forth on the wireless signal, the LTE communication unit 104 extracts packet data. The LTE communication unit 104 may also include a frequency conversion circuit, a demodulation circuit, an error correction decoding circuit, and so forth so as to be able to perform such conversion processing. The LTE communication unit 104 outputs the extracted packet data to a network.

The antenna 106 transmits, to the terminals 200-1 and 200-2 under control thereof, the wireless signal output from the LTE communication unit 104. Owing to this, the base station 100 is able to transmit the packet data to the terminals 200-1 and 200-2, based on a wireless communication method based on the LTE.

In addition, the antenna 106 receives wireless signals transmitted from the terminals 200-1 and 200-2 under control thereof, and outputs the received wireless signals to the LTE communication unit 104.

The wireless LAN transferring buffer 103 stores therein the packet data output from the sorting unit 101. The packet data stored in the wireless LAN transferring buffer 103 is read out by the wireless LAN communication unit 105, and transmitted using a wireless resource transmittable by the wireless LAN.

The wireless LAN communication unit 105 does not reserve a wireless resource by scheduling in such a way as, for example, the LTE communication unit 104, and transmits the packet data using a wireless resource shared with another base station.

In addition, the wireless LAN is an example of a wireless communication method where a wireless resource is shared with wireless communication in another base station, for example.

In the wireless LAN communication unit 105, the packet data is converted into a wireless signal, based on, for example, error correction encoding processing, modulation processing, frequency conversion processing, and so forth, and the wireless signal after conversion is output to an antenna 107.

In addition, the wireless LAN communication unit 105 receives a wireless signal output from the antenna 107, and extracts packet data from the wireless signal. In the wireless LAN communication unit 105, the packet data is extracted from the wireless signal, based on, for example, frequency conversion processing, demodulation processing, error correction decoding processing, and so forth. The wireless LAN communication unit 105 outputs the extracted packet data to the network.

The antenna 107 transmits, to the terminals 200-1 and 200-2 under control thereof, the wireless signal output from the wireless LAN communication unit 105. Owing to this, the base station 100 is able to transmit packet data to the terminals 200-1 and 200-2, based on a wireless communication method based on the wireless LAN.

In addition, the antenna 107 receives wireless signals transmitted from the terminals 200-1 and 200-2 under control thereof, and outputs the received wireless signals to the wireless LAN communication unit 105.

Figure 4:
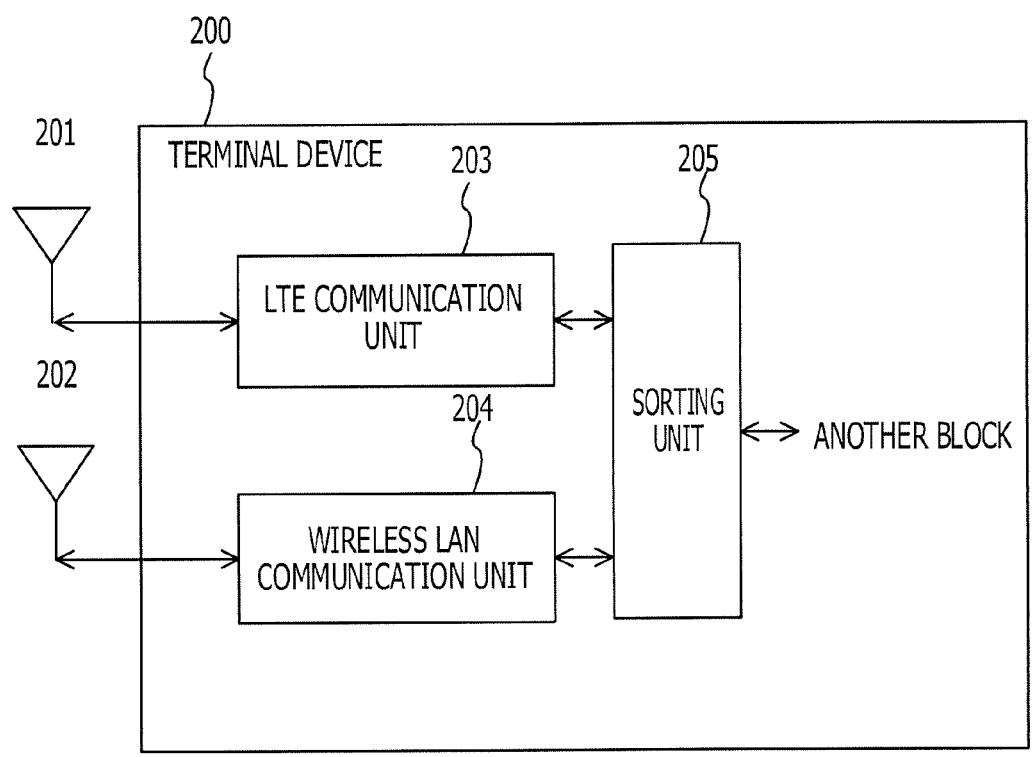
FIG. 4 is a diagram illustrating an example of a configuration of a terminal.

FIG. 4 is a diagram illustrating an example of the configuration of the terminal 200-1 or 200-2. The terminals 200-1 and 200-2 also have the same configuration, and hence, will be described as terminals 200 unless otherwise noted.

The terminal 200 includes antennas 201 and 202, an LTE communication unit 203, a wireless LAN communication unit 204, and a sorting unit 205.

The antenna 201 receives a wireless signal transmitted from the base station 100, and outputs the received wireless signal to the LTE communication unit 203. In addition, the antenna 201 transmits, to the base station 100, a wireless signal output from the LTE communication unit 203.

The antenna 202 receives a wireless signal transmitted from the base station 100, and outputs the received wireless signal to the wireless LAN communication unit 204. In addition, the antenna 202 transmits, to the base station 100, a wireless signal output from the wireless LAN communication unit 204.

The LTE communication unit 203 performs wireless communication conforming to a wireless communication method based on, for example, the LTE. In this case, the LTE communication unit 203 performs wireless communication with the base station 100 using a wireless resource subjected to scheduling and reserved by the base station 100.

For example, with respect to the wireless signal output from the antenna 201, the LTE communication unit 203 extracts a wireless signal addressed to the self-station, using such a wireless resource, and extracts packet data by performing frequency conversion processing, demodulation processing, error correction decoding processing, and so forth on the extracted wireless signal.

In addition, for example, the LTE communication unit 203 receives data and so forth, and converts such data into a wireless signal by performing thereon error correction encoding processing, modulation processing, frequency conversion processing, and so forth. In addition, the LTE communication unit 203 transmits the wireless signal after conversion to the base station 100, using, for example, the wireless resource subjected to scheduling by the base station 100.

The wireless LAN communication unit 204 shares a wireless resource used in, for example, wireless communication from a base station to a terminal and wireless communication performed by another base station. The wireless LAN communication unit 204 performs wireless communication with the base station 100 via the antenna 202 using, for example, the shared wireless resource. In the wireless LAN communication unit 204, based on, for example, frequency conversion processing, modulation/demodulation processing, error correction encoding and decoding processing, and so forth, it is possible to convert data received from another block into a wireless signal or extract packet data from a wireless signal received from a base station.

The sorting unit 205 outputs, to another block, the packet data extracted in the LTE communication unit 203 and the packet data extracted in the wireless LAN communication unit 204. In addition, packet data received from another block is sorted, and output to the LTE communication unit 203 or the wireless LAN communication unit 204.

<Example of Configuration of LTE Transferring Buffer>

Figure 5:
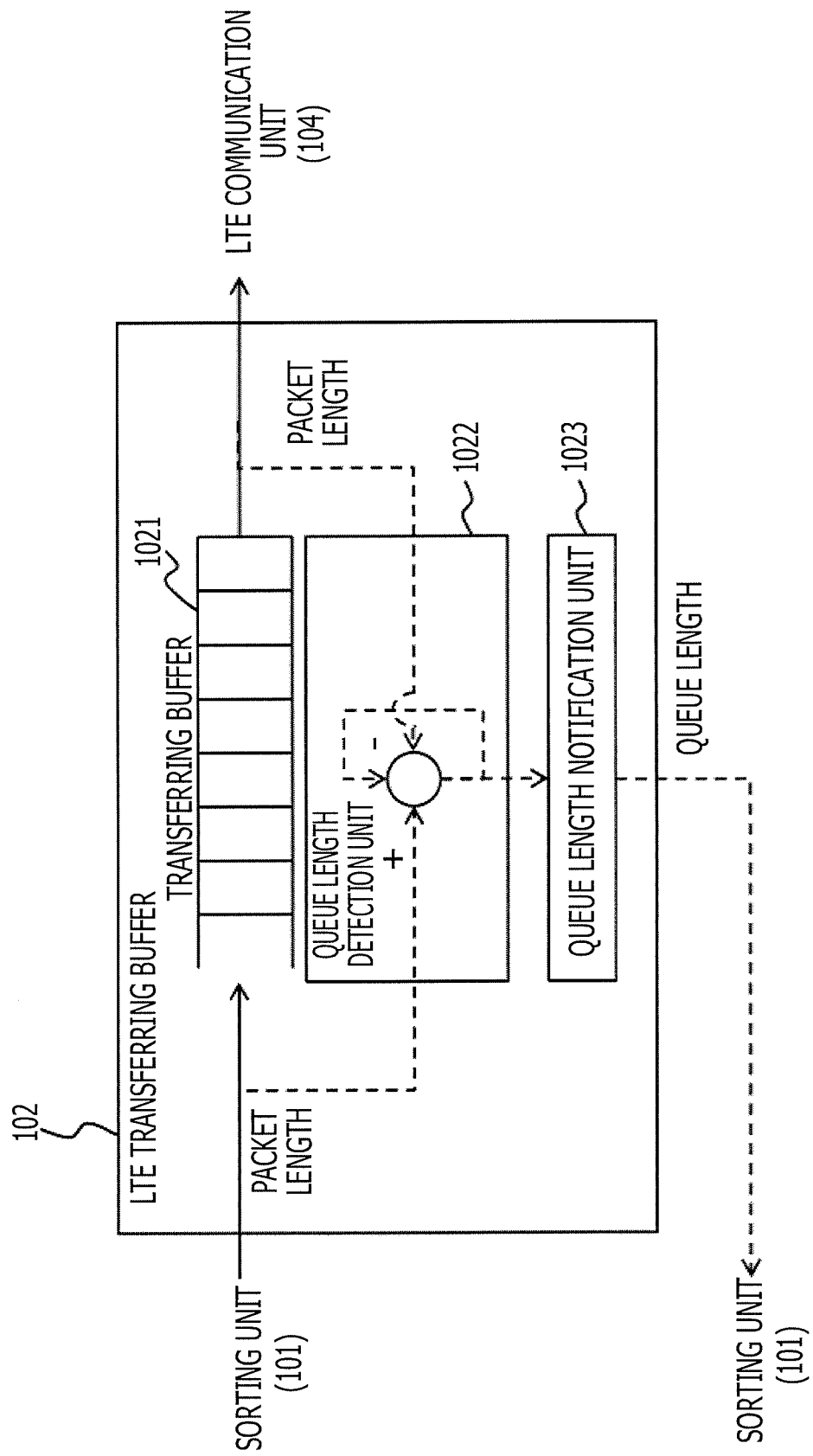
FIG. 5 is a diagram illustrating an example of a configuration of an LTE transferring buffer.

Next, an example of the configuration of the LTE transferring buffer 102 will be described. FIG. 5 is a diagram illustrating an example of the configuration of the LTE transferring buffer 102.

The LTE transferring buffer 102 includes a transferring buffer 1021, a queue length detection unit 1022, and a queue length notification unit 1023.

The transferring buffer 1021 is, for example, a memory of a queue method (first-in first-out method), and stores therein packet data output from the sorting unit 101. The packet data stored in the transferring buffer 1021 is read out by the LTE communication unit 104.

The queue length detection unit 1022 compares, for example, the packet length of packet data being to be stored in the transferring buffer 1021 and corresponding to the amount of one packet, with the packet length of packet data being read out from the transferring buffer 1021 and corresponding to the amount of one packet, and judges a queue length within the transferring buffer 1021. For example, the queue length detection unit 1022 adds the packet length of packet data corresponding to the amount of one packet when the packet data is stored in the transferring buffer 1021, subtracts the packet length of packet data corresponding to the amount of one packet when the packet data is read out from the transferring buffer 1021, and defines the result of the addition and subtraction as a queue length. The queue length detection unit 1022 outputs the detected queue length to the queue length notification unit 1023.

The queue length notification unit 1023 outputs, to the sorting unit 101, the queue length received from the queue length detection unit 1022.

In the LTE transferring buffer 102, for example, a data amount stored in the transferring buffer 1021 is calculated as the queue length, and the calculated queue length is output to the sorting unit 101, as queue length information.

<Example of Configuration of Sorting Unit>

Figure 6:
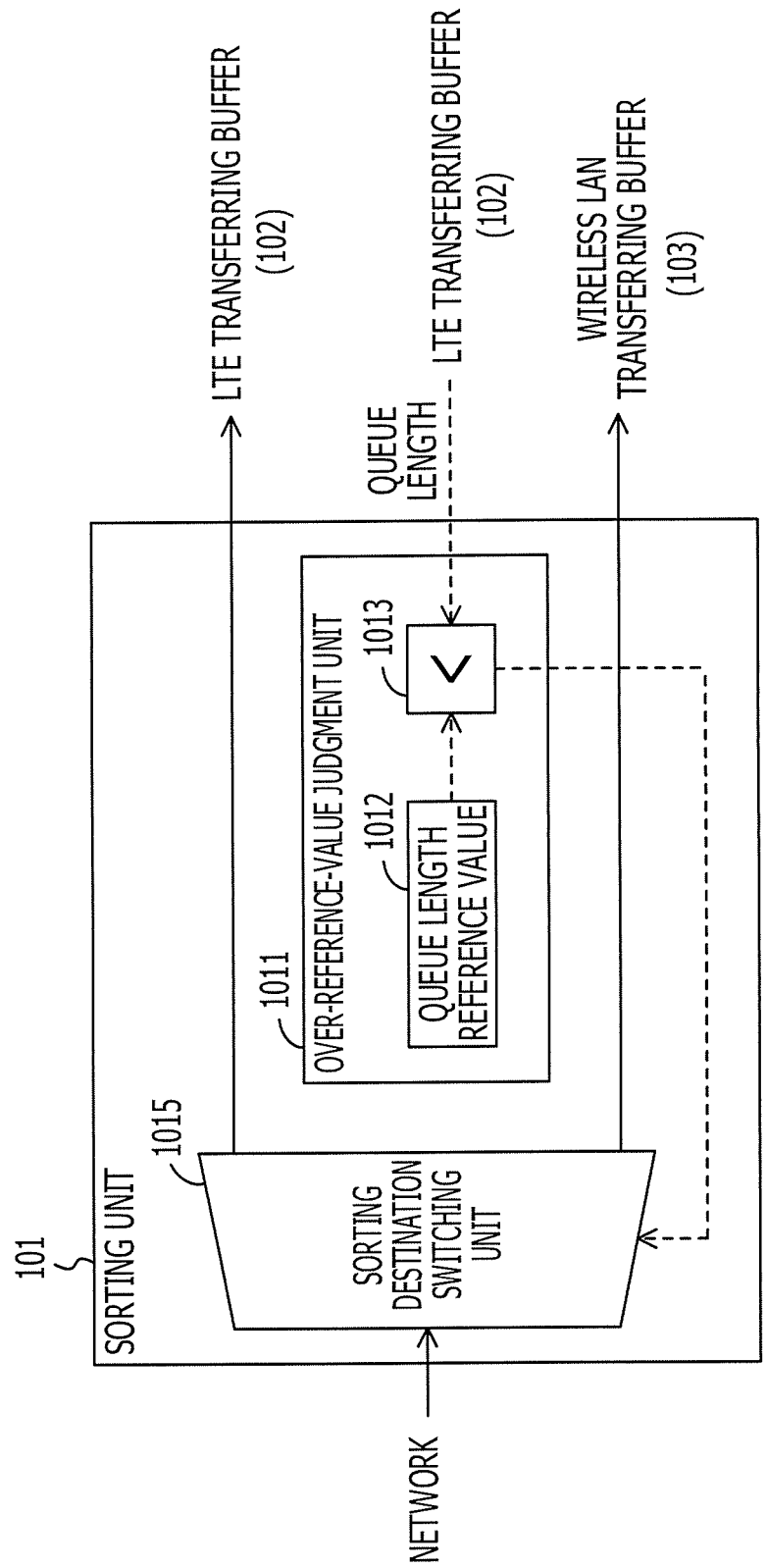
FIG. 6 is a diagram illustrating an example of a configuration of a sorting unit.

Next, an example of the configuration of the sorting unit 101 will be described. FIG. 6 is a diagram illustrating an example of the configuration of the sorting unit 101. The sorting unit 101 includes an over-reference-value judgment unit 1011 and a sorting destination switching unit 1015. In addition, the over-reference-value judgment unit 1011 includes a queue length reference value storage unit 1012 and a comparison unit 1013.

The queue length reference value storage unit 1012 is, for example, a memory, and stores therein a reference value.

The comparison unit 1013 compares the queue length received from the LTE transferring buffer 102 with the reference value read out from the queue length reference value storage unit 1012. In addition, the comparison unit 1013 notifies the sorting destination switching unit 1015 of the result of a comparison between the queue length and the reference value.

The sorting destination switching unit 1015 outputs packet data received from a network with sorting the packet data into the LTE transferring buffer 102 on a priority basis. In this case, the packet data sorted into the LTE transferring buffer 102 is transmitted based on a wireless communication method based on the LTE, using a reserved wireless resource.

However, when having received, from the over-reference-value judgment unit 1011, a comparison result to the effect that the queue length exceeds the reference value, the sorting destination switching unit 1015 outputs received packet data with switching to the wireless LAN transferring buffer 103. In this case, the packet data sorted into the wireless LAN transferring buffer 103 is transmitted to the terminal 200 using the wireless resource of the wireless LAN.

In addition, when having received, from the over-reference-value judgment unit 1011, the comparison result where the queue length becomes less than or equal to the reference value, the sorting destination switching unit 1015 returns the sorting destination of the packet data to the LTE transferring buffer 102. There is a margin in the wireless resource of the LTE, and hence, the base station 100 transmits the packet data using the wireless resource.

<Example of Operation>

Figure 7:
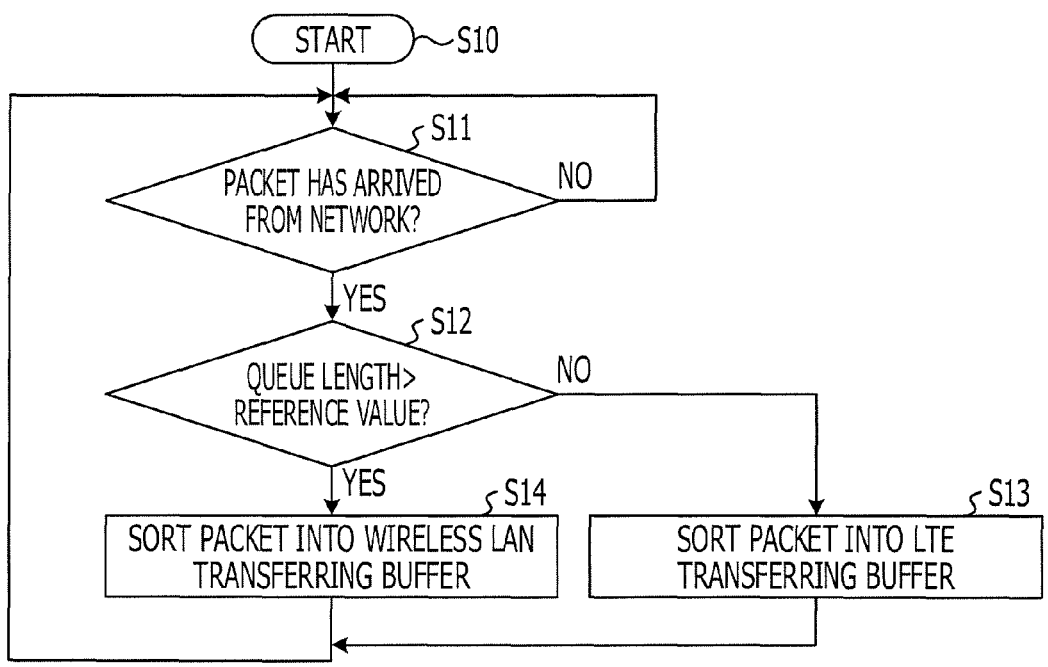
FIG. 7 is a flowchart illustrating an example of an operation of sorting processing.

Next, an example of an operation in the second embodiment will be described. FIG. 7 is a flowchart illustrating an example of the operation of sorting processing.

When having started the present processing (S10), the base station 100 judges whether or not a packet has arrived from a network (S11). For example, the sorting unit 101 judges based on whether or not packet data has been received from the network.

When not having received packet data from the network (S11: N), the base station 100 waits until receiving (S11: Loop of N).

On the other hand, when having received packet data from the network (S11: Y), the base station 100 judges whether or not the queue length of the LTE transferring buffer 102 exceeds the reference value (S12).

For example, when a wireless resource amount available for the LTE is greater than or equal to a threshold value, the base station 100 is able to transmit packet data using such a wireless resource. However, when a free wireless resource amount has become smaller than the threshold value or all of such a wireless resource has been used for transmission, it becomes difficult for the base station 100 to transmit packet data using such a wireless resource. In this case, packet data stays in the transferring buffer 1021, an input speed to the transferring buffer 1021 becomes faster than an output speed, and the queue length of the LTE transferring buffer 102 turns out to exceed the reference value. For example, the base station 100 judges whether or not the queue length of the LTE transferring buffer 102 exceeds the reference value, and hence, the base station 100 judges whether or not it is possible to transmit packet data using the wireless resource based on the LTE. The queue length expresses, for example, the usage amount of a reserved wireless resource based on the LTE.

When the queue length does not exceed the reference value (S12: N), the base station 100 sorts received packet data into the LTE transferring buffer 102 on a priority basis (S13).

For example, when having received a comparison result to the effect that the queue length does not exceed the reference value, the sorting unit 101 sorts the received packet data into the LTE transferring buffer 102. Such packet data is transmitted to the terminal 200 using, for example, a wireless resource reserved by a scheduler in the LTE communication unit 104.

On the other hand, when the queue length exceeds the reference value (S12: Y), the base station 100 switches a sorting destination, and sorts the received packet data into the wireless LAN transferring buffer 103 (S14).

For example, when having received a comparison result to the effect that the queue length has exceeded the reference value, the sorting unit 101 judges that it is difficult to transmit packet data using the wireless resource reserved for the LTE, and sorts the received packet data into the wireless LAN transferring buffer 103. Such packet data is transmitted to the terminal 200 using, for example, a wireless resource shared with a wireless resource used for wireless communication by another base station.

In this way, in the present embodiment, the base station 100 sorts the received packet data into the LTE transferring buffer 102 on a priority basis so that it is possible to transmit the received packet data using the wireless resource based on the LTE (S12: N, S13). In addition, as for packet data difficult to transmit using the wireless resource based on the LTE, the base station 100 transmits the packet data using a wireless resource based on the wireless LAN (S12: Y, S14).

Owing to this, in the base station 100, using the wireless resource of the wireless LAN, it is possible to transmit the packet data difficult to transmit using the wireless resource based on the LTE, and it is possible to transmit data using both the individual wireless resources of the LTE and the wireless LAN to the maximum. Therefore, it is possible for the base station 100 to achieve the effective utilization of the wireless resource.

In addition, in the base station 100, packet data is transmitted with optimizing the use of the wireless resource reserved for the LTE, and compared with a case where a margin occurs in such a wireless resource, the use of the reserved wireless resource is optimized. Therefore, it is possible to improve a throughput. In addition, the base station 100 performs transmission with optimizing the use of the reserved wireless resource, and compared with a case where there is a margin in such a wireless resource, it is also possible to achieve the effective utilization of the reserved wireless resource.

<Another Example in Second Embodiment>

Next, another example in the second embodiment will be described. In the above-mentioned example, a wireless resource amount available in a wireless communication method utilizing the LTE is judged using, for example, the queue length in the LTE transferring buffer 102. In the present example, a case will be described where judgment is performed using a leaky bucket counter. The leaky bucket counter is, for example, a counter simulating the operation of the transferring buffer 1021 in the LTE transferring buffer 102.

Figure 8:
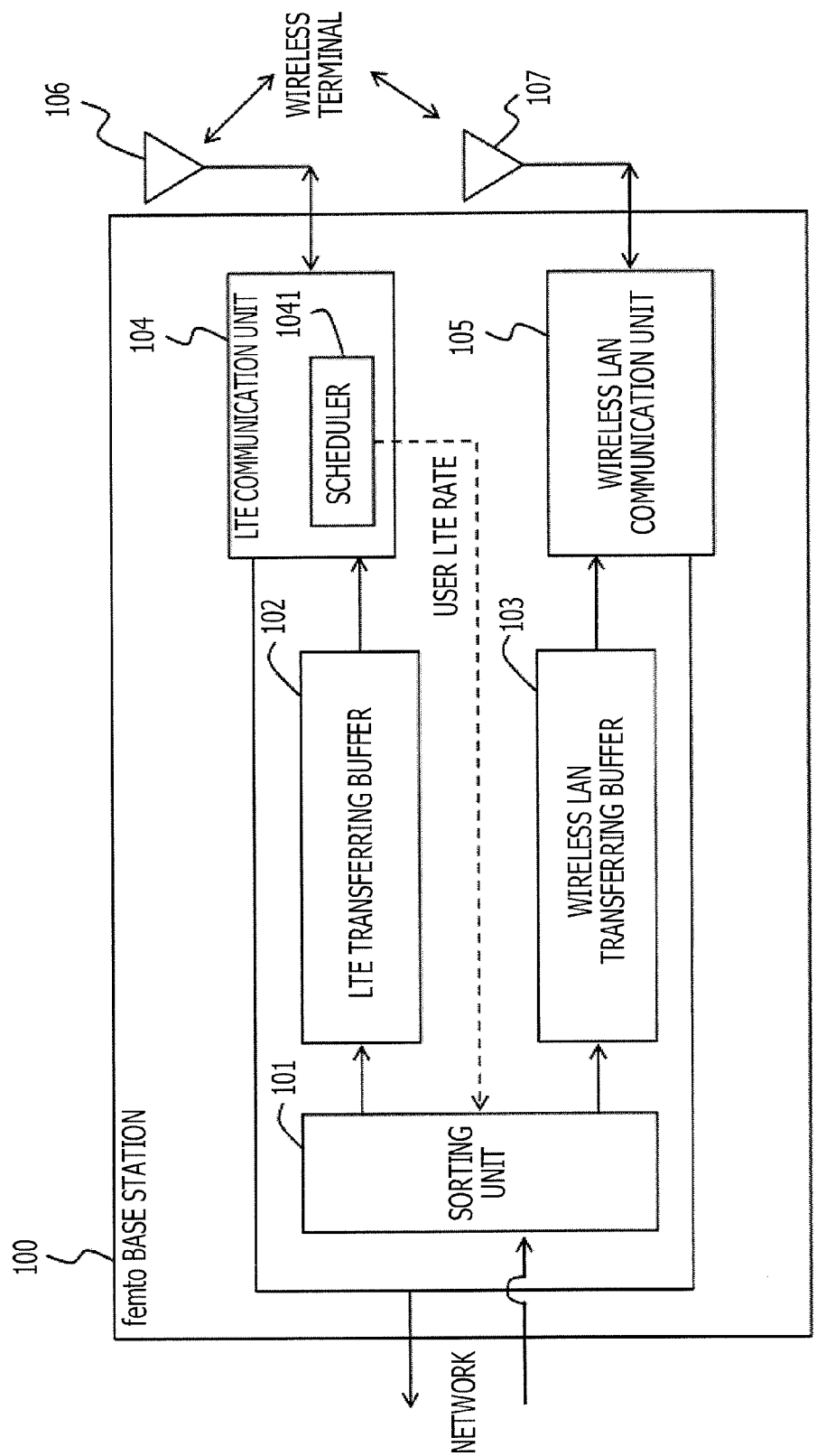
FIG. 8 is a diagram illustrating an example of a configuration of a base station.
Figure 9:
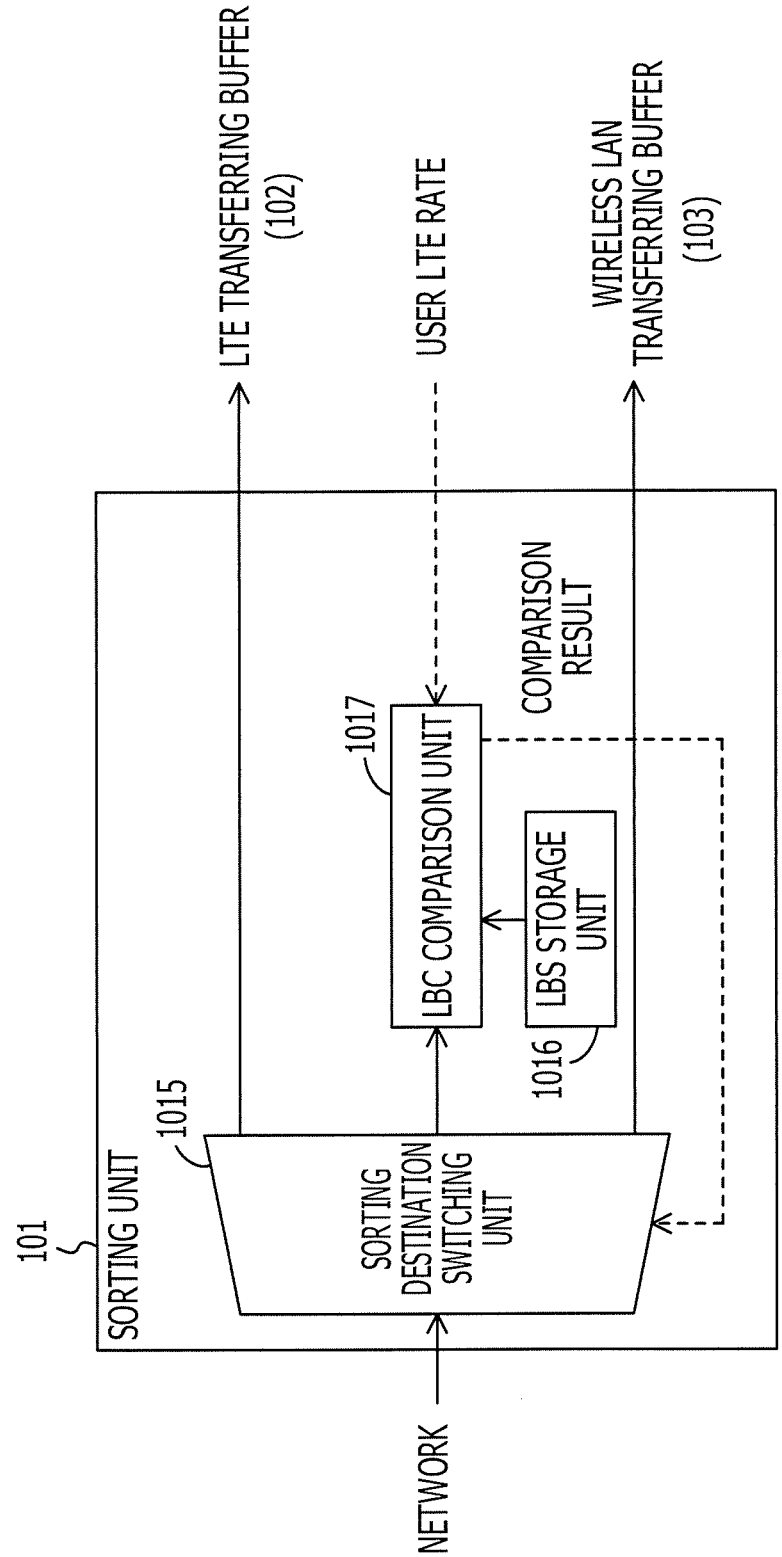
FIG. 9 is a diagram illustrating an example of a configuration of a sorting unit.
Figure 10:
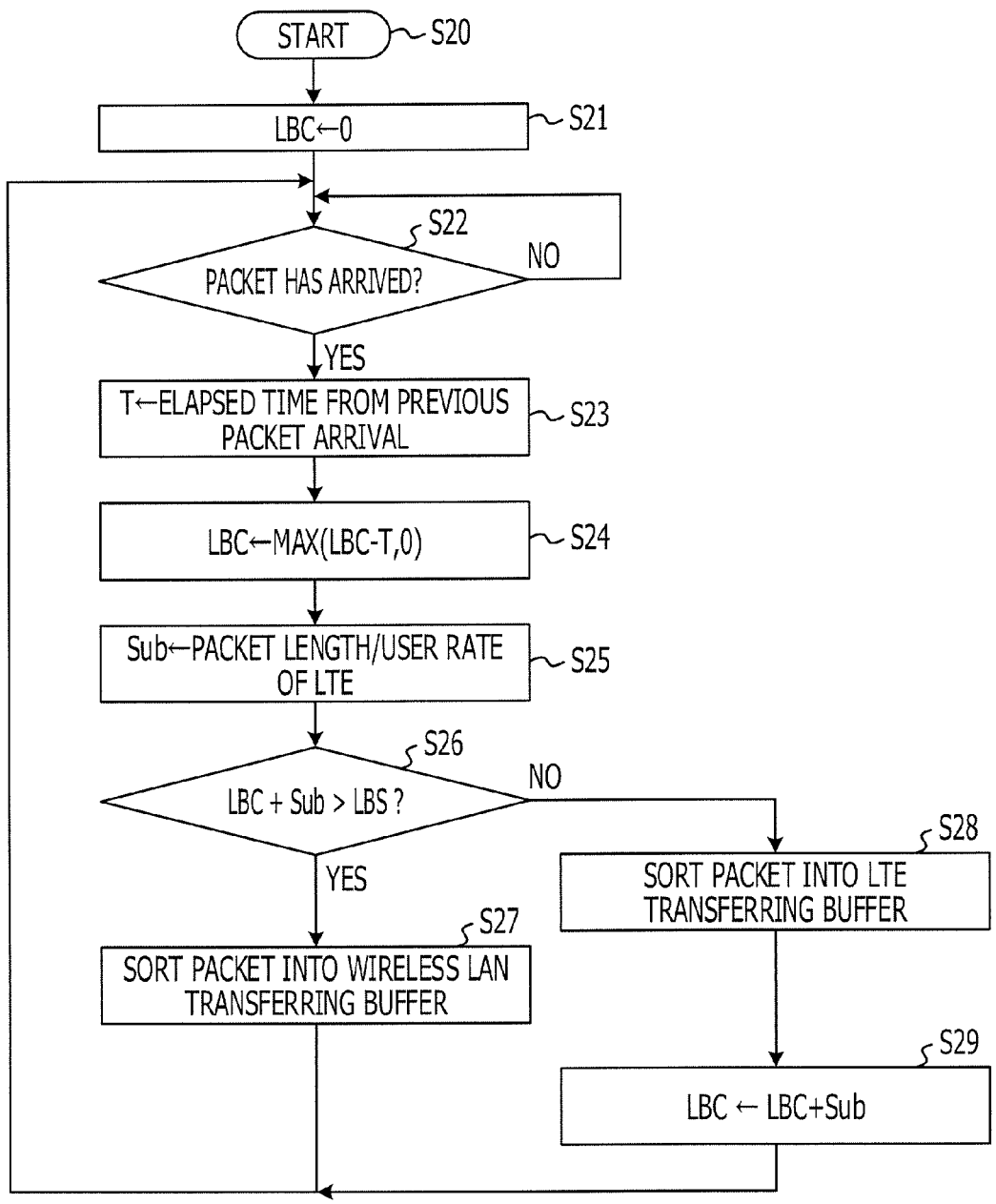
FIG. 10 is a flowchart illustrating an example of an operation of sorting processing.

FIG. 8 illustrates an example of the configuration of the base station 100, FIG. 9 illustrates an example of the configuration of the sorting unit 101, and FIG. 10 illustrates an example of a flowchart illustrating an example of the operation of sorting processing in the present example.

As illustrated in FIG. 8, the base station 100 includes a scheduler 1041 within the LTE communication unit 104.

The scheduler 1041 allocates a wireless resource with respect to, for example, each user (or each terminal 200), and determines a modulation and coding scheme (MCS) used in transmitting or receiving data. Owing to such allocation, it is possible for the base station 100 to transmit packet data using a reserved wireless resource.

On this occasion, the scheduler 1041 calculates a data rate corresponding to the determined MCS. The data rate expresses, for example, a data amount (for example, bps) transmitted or received to or from a user (or the terminal 200) per unit time. For example, the scheduler 1041 references a table stored in an internal memory or the like after the calculation of the MCS, and reads out data corresponding to the calculated MCS, and hence, it is possible to calculate the data rate. Alternatively, the scheduler 1041 may also calculate the data rate using a given calculation formula, based on the calculated MCS. The scheduler 1041 outputs, for example, the calculated data rate to the sorting unit 101, as a user LTE rate.

FIG. 9 is a diagram illustrating an example of the configuration of the sorting unit 101. The sorting unit 101 further includes a leaky bucket size (LBS) storage unit 1016 and a leaky bucket counter (LBC) comparison unit 1017.

The LBS storage unit 1016 is, for example, a memory, and stores therein an LBS. The LBS expresses, for example, a threshold value of whether or not packet data is transmittable using the wireless resource based on the LTE.

Based on, for example, the user LTE rate, the packet length (or the data length) of packet data, and the LBS, the LBC comparison unit 1017 judges whether or not such packet data is transmittable using the wireless resource based on the LTE, and outputs the judgment result (or the comparison result) thereof to the sorting destination switching unit 1015.

FIG. 10 is a flowchart illustrating an example of the operation of the base station 100. When having started processing (S20), the base station 100 sets LBC to "0". For example, the LBC comparison unit 1017 counts the counter value of the LBC, and sets the LBC to "0".

Next, the base station 100 judges whether or not packet data has arrived (S22), and when packet data has not arrived, the base station 100 waits until packet data arrives (S22: Loop of N). For example, since the sorting destination switching unit 1015 outputs packet data to the LBC comparison unit 1017 when having received the packet data from a network, it is possible for the LBC comparison unit 1017 to judge the present process (S22), based on whether or not the packet data is received.

When the packet data has arrived (S22: Y), the base station 100 sets an elapsed time T from the previous packet arrival (S23).

For example, in the flowchart illustrated in FIG. 10, every time packet data has arrived, processing is performed. The elapsed time T relates to, for example, packet data (hereinafter, referred to as previous packet data in some cases) having arrived immediately before packet data (hereinafter, referred to as current packet data in some cases) in the present processing, and expresses an elapsed time from the arrival of the previous packet data to the arrival of the current packet data. For example, regarding packet data received from the sorting destination switching unit 1015, the LBC comparison unit 1017 counts the interval thereof, and hence, the elapsed time T is measured.

Next, the base station 100 compares (LBC−T) with "0", and sets one thereof having a larger value, in the LBC (S24).

For example, the LBC is a counter simulating the LTE transferring buffer 102, and a counter value expresses a time taken before packet data stored in the LTE transferring buffer 102 is read out.

During the elapsed time T from the arrival of the previous packet data to the arrival of the current packet data, the packet data stored in the LTE transferring buffer 102 is read out. In the LTE transferring buffer 102, the data amount of stored packet data decreases by the amount of the read packet data. The (LBC-T) expresses, for example, a time taken before packet data stored (or remaining) in the LTE transferring buffer 102 is read out after the elapsed time T has elapsed.

For example, the LBC comparison unit 1017 reads out the LBC stored in the internal memory, calculates and compares the (LBC-T) with "0", and stores, as the LBC, a larger one in an internal memory.

Next, the base station 100 divides the "packet length" of the current packet data by an "LTE user rate", and sets the result thereof as Sub (S25).

For example, the "packet length" expresses the length of the amount of one packet out of the current packet data, and the "LTE user rate" expresses a data rate (for example, bps) as to the current packet data. Accordingly, as for, for example, one packet out of packet data having arrived this time, the Sub expresses a time taken before such a packet is read out and transmitted from the LTE transferring buffer 102 after having arrived.

For example, with respect to packet data received from the sorting destination switching unit 1015, the LBC comparison unit 1017 calculates the packet length of the amount of one packet, and calculates the Sub by dividing such a packet length by the user LTE rate received from the scheduler 1041.

Next, the base station 100 adds the LBC calculated in S24 and the Sub calculated in S25, and judges whether or not an addition value is larger than the LBS (S26).

The addition value of the LBC, calculated in S24, expresses, for example, the following. In other words, the addition value of the LBC expresses a time taken before all packet data stored in the LTE transferring buffer 102 is transmitted when, with respect to packet data stored in the LTE transferring buffer 102, data corresponding to the amount of one packet having arrived this time is further stored in the LTE transferring buffer 102.

Accordingly, in the present process (S26), for example, after the amount of one packet out of the current packet data has been stored in the LTE transferring buffer 102, it is judged whether or not the wireless resource based on the LTE is available with respect to all packet data stored in the LTE transferring buffer 102.

For example, in the present process (S26), the LBC calculated in S24 by the LBC comparison unit 1017 is read out from the internal memory and added to the Sub calculated in S25, the LBS stored in the LBS storage unit 1016 is read out and compared with an addition value, and hence processing is performed.

When the addition value of the LBC and the Sub is not larger than the LBS (S26: N), the base station 100 sorts one packet out of packet data having arrived, into the LTE transferring buffer 102 (S28).

On the other hand, when the addition value of the LBC and the Sub is larger than the LBS (S26: Y), the base station 100 sorts one packet out of packet data having arrived, into the wireless LAN transferring buffer 103 (S27).

When having sorted packet data into the LTE transferring buffer 102 (S28), the base station 100 adds the Sub to the value calculated in S24 with respect to the LBC, and updates the LBC (S29). For example, by storing, in the internal memory, the addition value calculated in S26, the LBC comparison unit 1017 updates the LBC.

When the processes in S27 and S29 have finished, the base station 100 proceeds to S22, and waits for the arrival of new packet data.

In this way, in the present example, when a time is greater than or equal to the threshold value, the time being taken for transmitting packet data corresponding to the amount of one packet out of all packet data stored in the LTE transferring buffer 103 and received packet data, it is judged that it is difficult to transmit one such packet using a wireless resource based on the LTE. In such a case, the base station 100 transmits one such packet using a wireless resource based on the wireless LAN.

Also in the present example, in the same way as the above-mentioned example, the base station 100 transmits packet data using a wireless resource based on the wireless LAN, the packet data being difficult to transmit using a wireless resource based on the LTE (for example, S27). Accordingly, it is possible to transmit data using both the individual wireless resources of the LTE and the wireless LAN to the maximum. Therefore, it is possible for the base station 100 to achieve the effective utilization of the wireless resource.

In addition, in the base station 100, packet data is transmitted with optimizing the use of the reserved wireless resource (S26: N, S28), and compared with a case where a margin occurs in such a wireless resource, the use of the reserved wireless resource is optimized. Therefore, it is possible to improve a throughput. In this case, the base station 100 performs transmission with optimizing the use of the reserved wireless resource, and compared with a case where there is a margin in such a wireless resource, it is possible to achieve the effective utilization of the reserved wireless resource.

As for the above-mentioned example, for example, when having received, from the scheduler 1041, a notice to the effect that it is difficult to allocate a wireless resource, the base station 100 may also switch a sorting destination from the LTE transferring buffer 102 to the wireless LAN transferring buffer 103. In this case, for example, there are not the processes from S23 to S26, and until receiving, from the scheduler 1041, a notice to the effect that it is difficult to allocate a wireless resource, the LBC comparison unit 1017 defines the LTE transferring buffer 102 as the sorting destination on a priority basis. In addition, when having received such a notice, the LBC comparison unit 1017 may also switch to the wireless LAN transferring buffer 103.

As another example in the preset first embodiment, for example, there is the following example. In other words, while any one of the above-mentioned examples has been described using an example where the individual communication functions of the LTE and the wireless LAN are embedded in the base station 100, the communication function of the wireless LAN may also be an external device.

Figure 11:
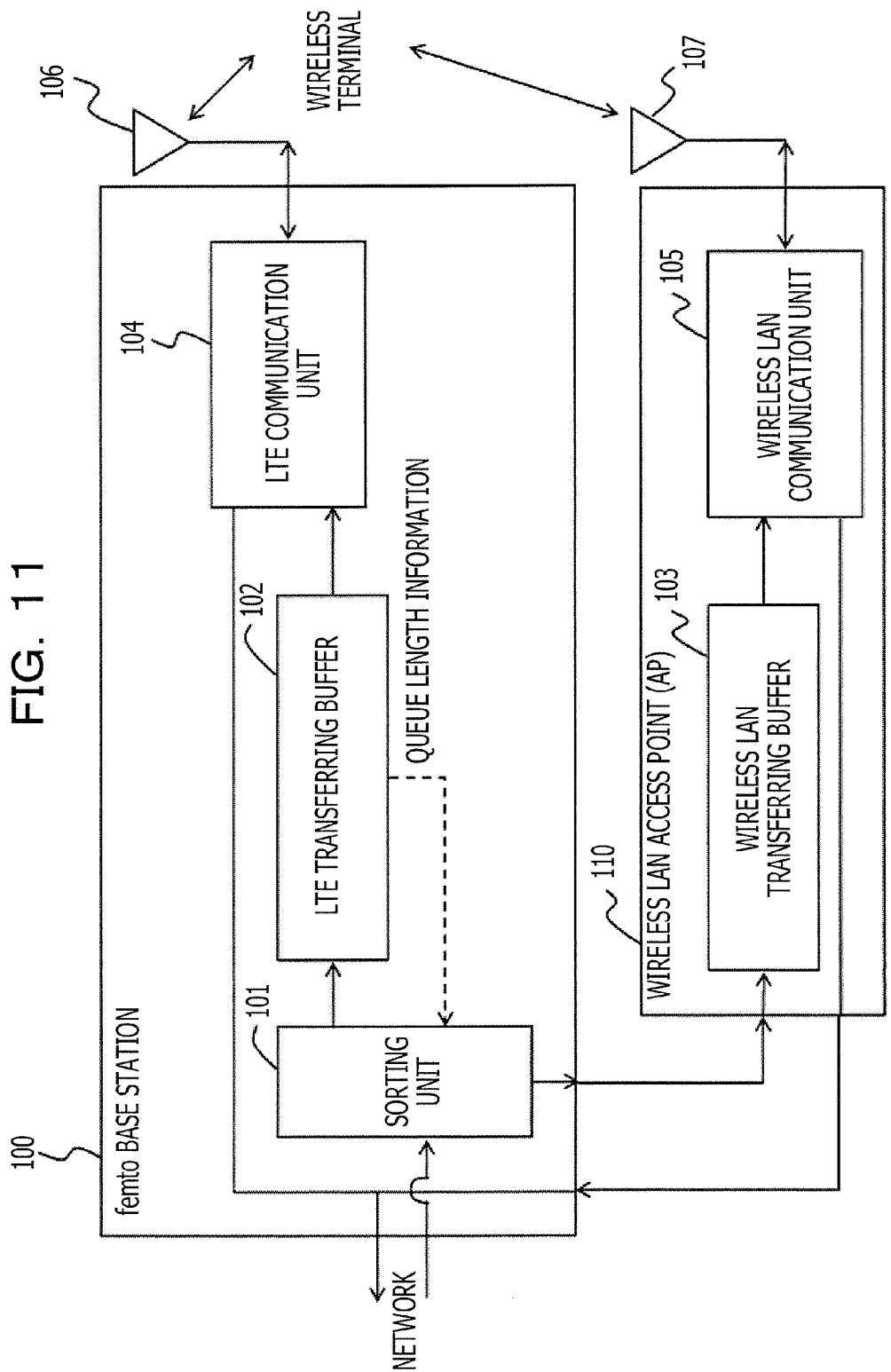
FIG. 11 is a diagram illustrating an example of a configuration of a base station.

FIG. 11 illustrates an example of a configuration in a case where the wireless LAN transferring buffer 103 and the wireless LAN communication unit 105 are connected to the base station 100, as a wireless LAN access point (AP) 110. A process in the sorting unit 101 is performed in the same way as the above-mentioned example.

Figure 12:
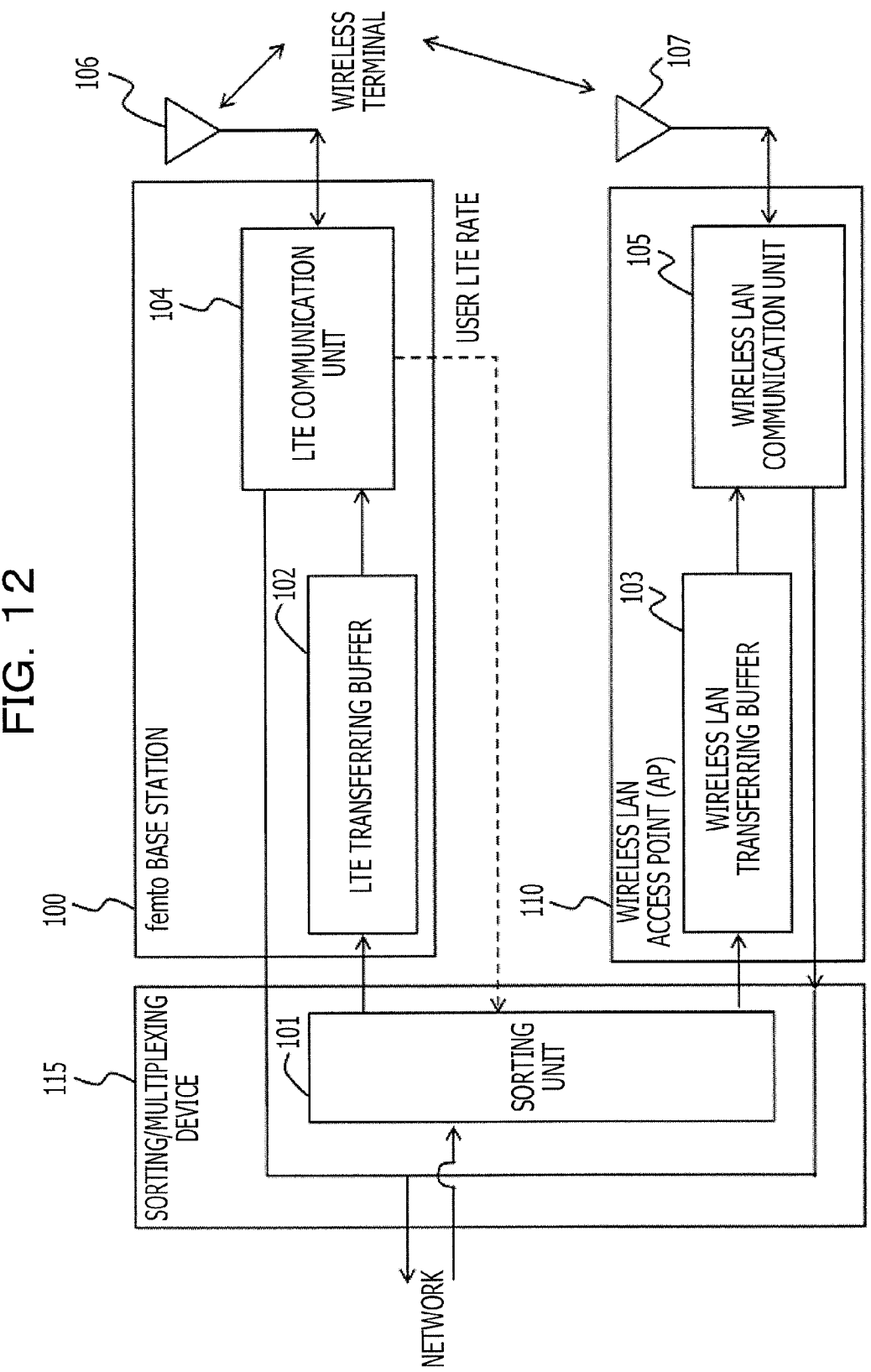
FIG. 12 is a diagram illustrating an example of a configuration of a base station.

In addition, furthermore, FIG. 12 illustrates an example of a configuration in a case where the sorting unit 101 is included in a sorting/multiplexing device 115 and disposed as a device separate from the base station 100. In the same way as the above-mentioned example, the sorting unit 101 outputs packet data to the LTE transferring buffer 102 or the wireless LAN transferring buffer 103. In the example in FIG. 12, the sorting unit 101 sorts into the base station 100 or the wireless LAN AP 110, and the base station 100 outputs the user LTE rate to the sorting/multiplexing device 115.

Furthermore, for example, an example may also be adopted where the above-mentioned examples are combined. For example, as for FIG. 11, the LTE communication unit 104 may also notify the sorting unit 101 of the user LTE rate, and processing utilizing the leaky bucket counter (for example, FIG. 10) may also be performed. In addition, as for the example in FIG. 12, a queue length may also be output from the LTE transferring buffer 102, and processing for the queue length (for example, FIG. 7) may also be performed.

Third Embodiment

Next, a third embodiment will be described. The third embodiment is an example applied to a base station capable of performing communication using, for example, different frequency bands with respect to a wireless communication method based on the LTE.

Figure 13:
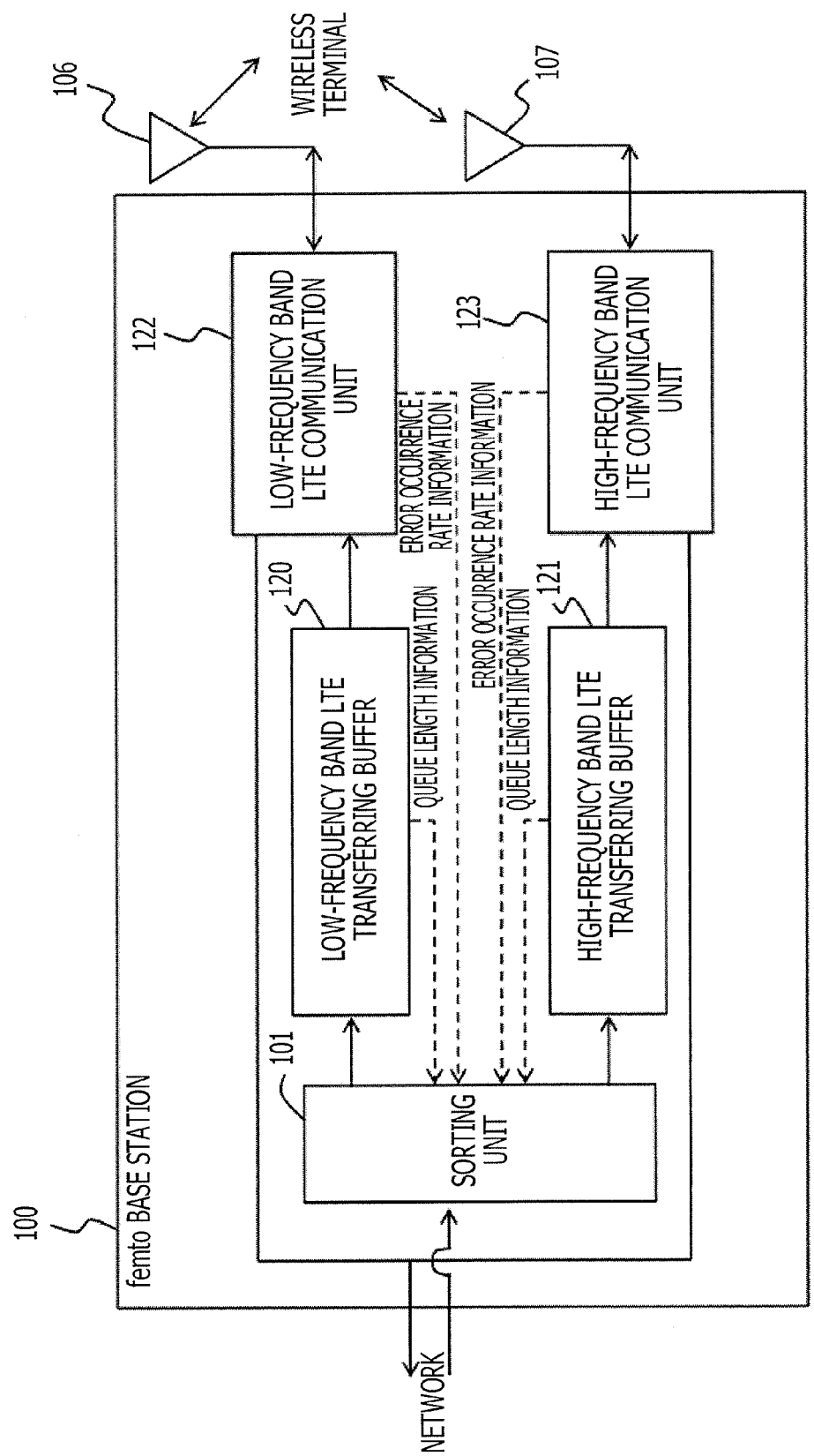
FIG. 13 is a diagram illustrating an example of a configuration of a base station.

FIG. 13 illustrates an example of the configuration of the base station 100 in the present third embodiment. The base station 100 further includes a low-frequency band LTE transferring buffer 120, a high-frequency band LTE transferring buffer 121, a low-frequency band LTE communication unit 122, and a high-frequency band LTE communication unit 123.

In a wireless communication method utilizing the LTE, wireless communication is performed using, for example, a plurality of frequency bands in some cases. For example, when a frequency band is different, the reachability of an electric wave or an interference noise from the environment is different, and a communication quality between the base station 100 and the terminal 200 is also different in response to that. The communication quality is, for example, calculated the terminal 200 and given notice of to the base station 100, and the base station 100 selects an MCS, based on the communication quality given notice of.

In the present third embodiment, for example, the base station 100 divides into two frequency bands of a high-frequency band and a low-frequency band with respect to the wireless communication method based on the LTE, and performs wireless communication with prioritizing a frequency band whose error occurrence rate is low, in other words, whose communication quality is good. In addition, for example, when the available wireless resource amount of such a frequency band has become less than or equal to a threshold value, the base station 100 performs wireless communication using a frequency band whose communication quality is low.

The low-frequency band LTE transferring buffer 120 stores therein packet data output from the sorting unit 101. The packet data stored in the low-frequency band LTE transferring buffer 120 is read out by the low-frequency band LTE communication unit 122, and transmitted using the wireless resource of a frequency band lower than a frequency band utilized by the high-frequency band LTE communication unit 123.

In addition, in the present second embodiment, the low-frequency band LTE transferring buffer 120 outputs queue length information in the same way as the LTE transferring buffer 102 in the first embodiment (for example, FIG. 5). For example, in the same way as the LTE transferring buffer 102 illustrated in FIG. 5, the low-frequency band LTE transferring buffer 120 may also include the transferring buffer 1021, the queue length information detection unit 1022, and the queue length notification unit 1023.

The low-frequency band LTE communication unit 122 performs error correction encoding processing, modulation processing, frequency conversion processing, and so forth on the packet data stored in the low-frequency band LTE transferring buffer 120, converts the packet data into a wireless signal, and outputs such a wireless signal to the antenna 106. In addition, the low-frequency band LTE communication unit 122 performs frequency conversion processing, demodulation processing, error correction decoding processing, and so forth on a wireless signal received from the antenna 106, and extracts packet data. Within the low-frequency band LTE communication unit 122, an error correction encoding circuit, a modulation/demodulation circuit, a frequency conversion circuit, and so forth may also be provided so as to perform such processing.

In addition, based on quality information received from the terminal 200, the low-frequency band LTE communication unit 122 in the present third embodiment calculates and outputs error occurrence rate information to the sorting unit 101. The detail of the low-frequency band LTE communication unit 122 will be described later.

The high-frequency band LTE transferring buffer 121 stores therein packet data output from the sorting unit 101. The packet data stored in the high-frequency band LTE transferring buffer 121 is read out by the high-frequency band LTE communication unit 123, and transmitted using the wireless resource of a frequency band higher than a frequency band utilized by the low-frequency band LTE communication unit 122.

The high-frequency band LTE communication unit 123 performs error correction encoding processing, modulation processing, frequency conversion processing, and so forth on the packet data stored in the high-frequency band LTE transferring buffer 121, converts the packet data into a wireless signal, and outputs such a wireless signal to the antenna 107. In addition, the high-frequency band LTE communication unit 123 performs frequency conversion processing, demodulation processing, error correction decoding processing, and so forth on a wireless signal received from the antenna 107, and extracts packet data. Within the high-frequency band LTE communication unit 123, an error correction encoding circuit, a modulation/demodulation circuit, a frequency conversion circuit, and so forth may also be provided so as to perform such processing.

In addition, based on quality information received from the terminal 200, the high-frequency band LTE communication unit 123 also calculates and outputs error occurrence rate information to the sorting unit 101. The detail of the high-frequency band LTE communication unit 123 will be described later.

In addition, both the low-frequency band LTE communication unit 122 and the high-frequency band LTE communication unit 123 perform wireless communication with the terminal 200, based on wireless communication methods based on the LTE.

Figure 14:
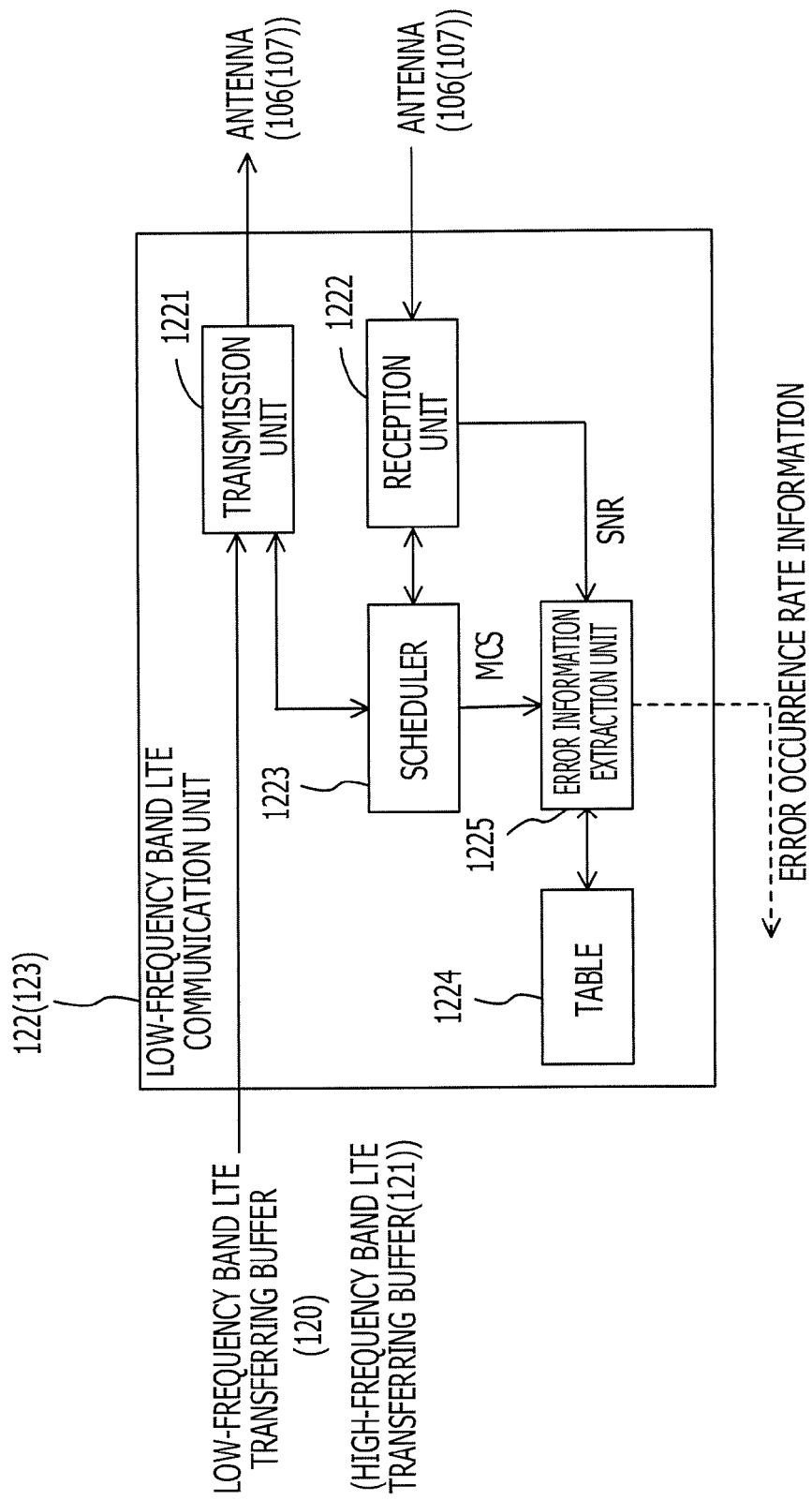
FIG. 14 is a diagram illustrating an example of a configuration of a low-frequency band LTE communication unit.

FIG. 14 is a diagram illustrating an example of the configuration of the low-frequency band LTE communication unit 122. The low-frequency band LTE communication unit 122 includes a transmission unit 1221, a reception unit 1222, a scheduler 1223, a table 1224, and an error information extraction unit 1225.

The transmission unit 1221 performs, for example, error correction encoding processing and so forth on packet data, converts the packet data into a wireless signal, and outputs the wireless signal to the antenna 106. The transmission unit 1221 performs, for example, error correction encoding processing, modulation processing, and so forth using the MCS determined in the scheduler 1223, and outputs a wireless signal to the antenna 106 using a wireless resource subjected to scheduling in the scheduler 1223.

The reception unit 1222 performs, for example, error correction decoding processing and so forth on a wireless signal received from the antenna 106, and extracts packet data. The reception unit 1222 also extracts a wireless signal for a relevant user using, for example, a wireless resource subjected to scheduling in the scheduler 1223, and extracts packet data from the wireless signal by performing demodulation processing and so forth using the determined MCS.

In addition, the reception unit 1222 receives the quality information measured in, for example, the terminal 200, as a wireless signal, and extracts the quality information from the wireless signal. As the quality information, for example, reception power, a signal to noise ratio (SNR), or the like may be cited. The reception unit 1222 outputs the extracted quality information to the scheduler 1223 and the error information extraction unit 1225.

In addition, the quality information is measured in, for example, the LTE communication unit 203 in the terminal 200 (for example, FIG. 4). In this case, by measuring the reception power, the SNR, or the like with respect to, for example, a wireless signal transmitted from the base station 100, the LTE communication unit 203 measures the quality information. The LTE communication unit 203 converts the quality information into a wireless signal, and transmits the wireless signal to the base station 100.

Based on, for example, the quality information received from the reception unit 1222, the scheduler 1223 determines the MCS, and performs scheduling of which wireless resource transmission and reception are performed with respect to the terminal 200 by use of. The scheduler 1223 outputs, for example, information relating to the scheduling or the MCS to the transmission unit 1221. In addition, the scheduler 1223 outputs, for example, the determined MCS to the error information extraction unit 1225.

The table 1224 is, for example, a memory, and stores therein the quality information, the MCS, and error occurrence rates corresponding to these. As error occurrence rate information, for example, a block error rate is cited. The block error rate expresses, for example, the ratio of the number of blocks having become cyclic redundancy check (CRC) errors to the total number of transport blocks within a given period of time. The block error rate is, for example, a ratio according to the quality information and the MCS.

When having received the quality information and the MCS, the error information extraction unit 1225 extracts (or generates) error occurrence rate information (or error information) by reading out the error occurrence rate information according to the quality information and the MCS from the table 1224. The error information extraction unit 1225 outputs the extracted error occurrence rate information to the sorting unit 101.

For example, as illustrated in FIG. 14, the high-frequency band LTE communication unit 123 also has the same configuration as the low-frequency band LTE communication unit 122. In this regard, however, in the transmission unit 1221 and the reception unit 1222 in the high-frequency band LTE communication unit 123, a processable frequency band is a higher-frequency band than that in the low-frequency band LTE communication unit 122.

Figure 15:
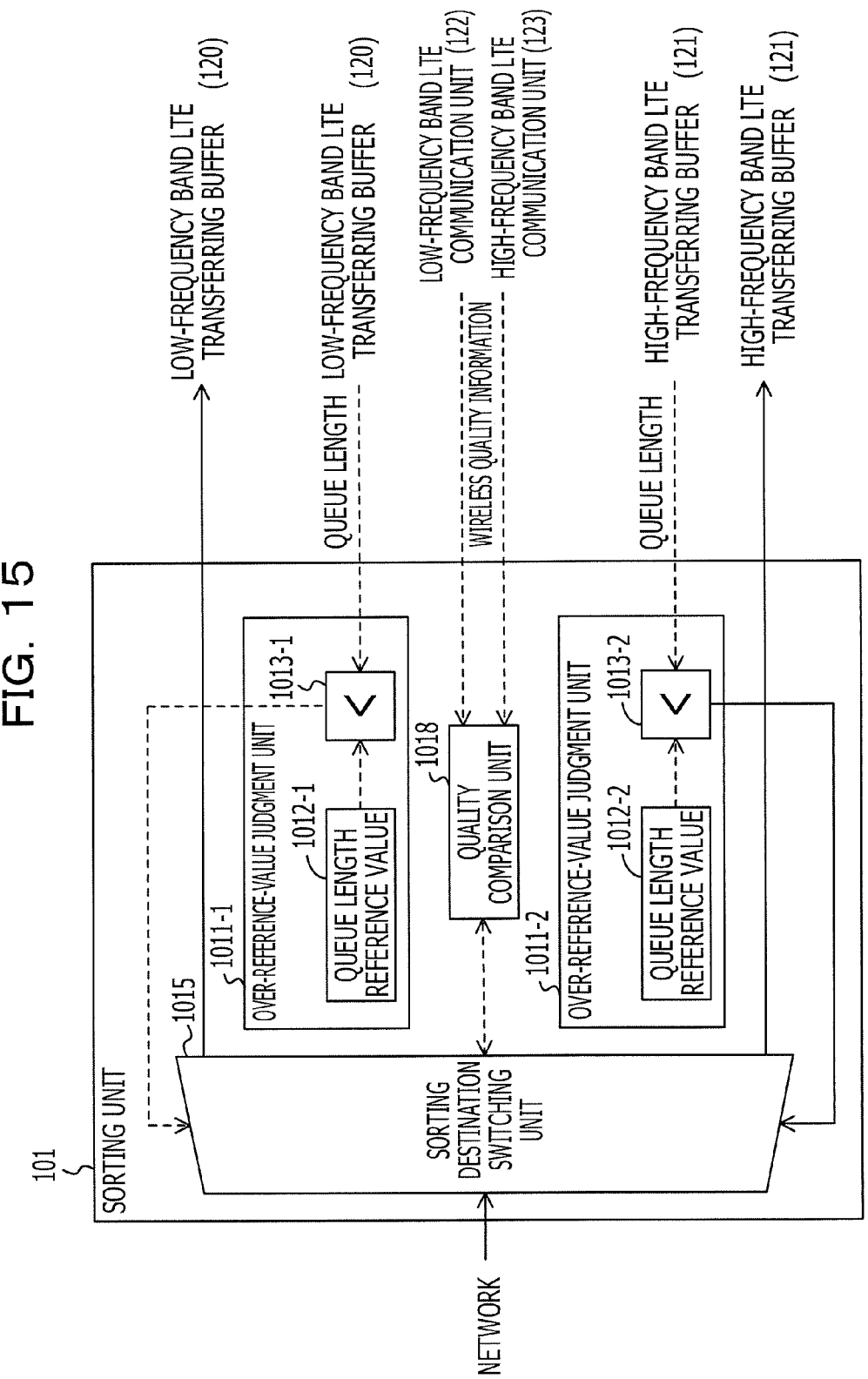
FIG. 15 is a diagram illustrating an example of a configuration of a sorting unit.

FIG. 15 is a diagram illustrating an example of the configuration of the sorting unit 101 in the present second embodiment. The sorting unit 101 further includes first and second over-reference-value judgment units 1011-1 and 1011-2 and a quality comparison unit 1018.

The first over-reference-value judgment unit 1011-1 includes a first queue length reference value storage unit 1012-1 and a first comparison unit 1013-1. In addition, the second over-reference-value judgment unit 1011-2 includes a second queue length reference value storage unit 1012-2 and a second comparison unit 1013-2.

The first and second queue length reference value storage units 1012-1 and 1012-2 individually store therein, for example, queue length reference values.

The first comparison unit 1013-1 compares queue length information output from the low-frequency band LTE transferring buffer 120 with the queue length reference value read out from the first queue length reference value storage unit 1012-1, and outputs the comparison result thereof to the sorting destination switching unit 1015.

The second comparison unit 1013-2 compares queue length information output from the high-frequency band LTE transferring buffer 121 with the queue length reference value read out from the second queue length reference value storage unit 1012-2, and outputs the comparison result thereof to the sorting destination switching unit 1015.

The quality comparison unit 1018 judges which of the pieces of quality information individually output from the low-frequency band LTE communication unit 122 and the high-frequency band LTE communication unit 123 is good in quality, and outputs a judgment result to the sorting destination switching unit 1015.

When the quality information output from the low-frequency band LTE communication unit 122 has a better quality than the quality information output from the high-frequency band LTE communication unit 123, the sorting destination switching unit 1015 sets the sorting destination of packet data to a low-frequency band LTE transferring buffer 120 side on a priority basis. On the other hand, when the quality information output from the high-frequency band LTE communication unit 123 has a better quality than the quality information output from the low-frequency band LTE communication unit 122, the sorting destination switching unit 1015 sets the sorting destination of packet data to a high-frequency band LTE transferring buffer 121 side on a priority basis. In addition, when a queue length exceeds the reference value with respect to the buffer 120 or 121 serving as a prioritized sorting destination, the sorting destination switching unit 1015 switches the sorting destination to a frequency band side not serving as a prioritized frequency band side.

Figure 16:
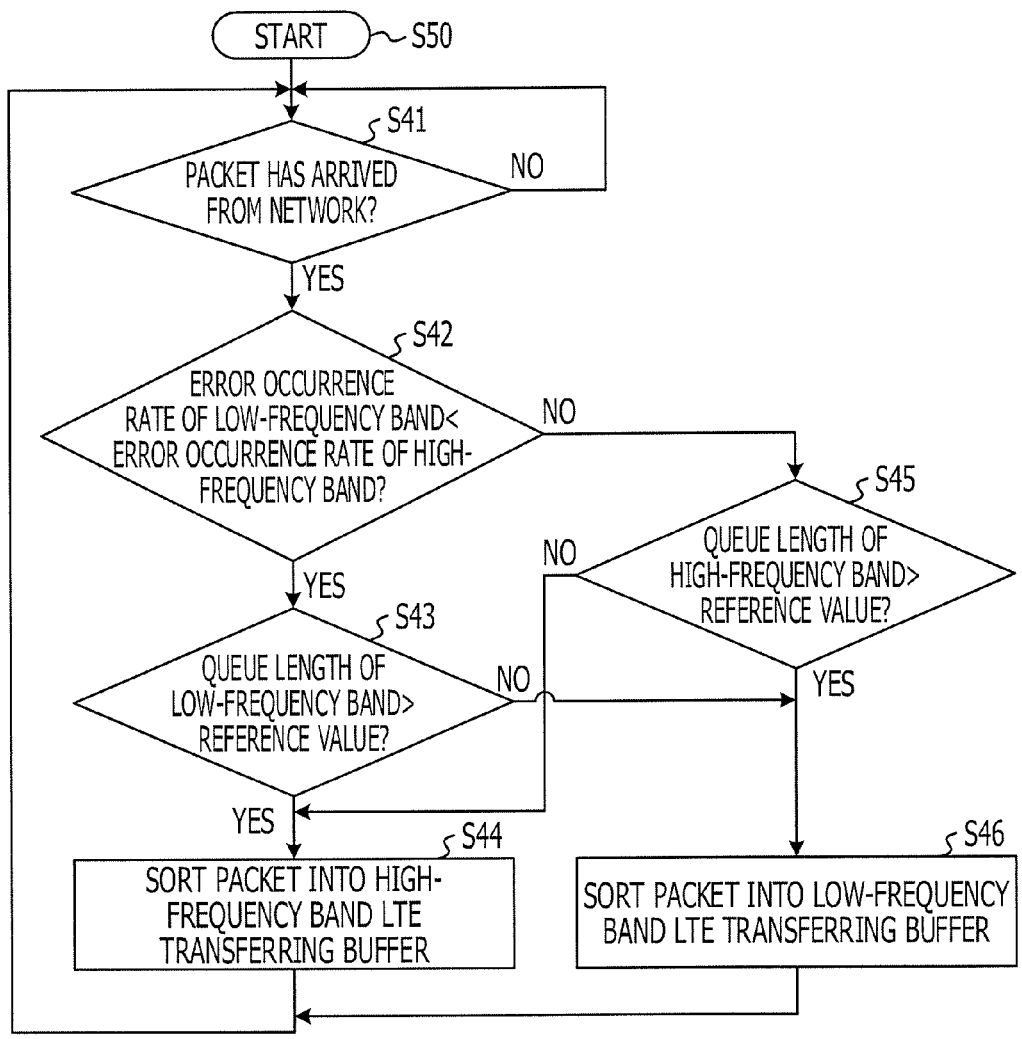
FIG. 16 is a flowchart illustrating an example of an operation of sorting processing.

FIG. 16 is a flowchart illustrating an example of an operation in the present third embodiment. When having started the present processing (S40), the base station 100 judges whether or not a packet has arrived from a network (S41).

When not having received packet data, the base station 100 waits until receiving (S41: Loop of N), and when having received packet data (S41: Y), the base station 100 judges whether or not the error occurrence rate of the high-frequency band is higher than the error occurrence rate of the low-frequency band (S42).

For example, the quality comparison unit 1018 receives the error occurrence rate of the high-frequency band and the error occurrence rate of the low-frequency band, compares the two with each other, and selects one thereof whose quality is better. For example, the quality comparison unit 1018 notifies the sorting destination switching unit 1015 of a frequency band whose quality is good.

When the error occurrence rate of the high-frequency band is higher than the error occurrence rate of the low-frequency band (S42: Y) and the queue length of the low-frequency band LTE transferring buffer 120 does not exceed the reference value (S43: N), the base station 100 sorts packet data into the low-frequency band LTE transferring buffer 120 on a priority basis (S46).

In this case, for example, the low-frequency band is better in communication quality than the high-frequency band, and the base station 100 sorts packet data into the low-frequency band LTE transferring buffer 120 on a priority basis, and transmits the packet data using the wireless resource of the low-frequency band.

For example, when the first comparison unit 1013-1 has judged that the queue length information from the low-frequency band LTE transferring buffer 120 does not exceed the queue length reference value, the judgment result thereof is output to the sorting destination switching unit 1015. Based on such a judgment result, the sorting destination switching unit 1015 sets the sorting destination to the low-frequency band LTE transferring buffer 120.

In addition, the processing returns to S41, and the base station 100 repeats the above-mentioned processing.

On the other hand, when the queue length of the low-frequency band exceeds the reference value (S43:Y), the base station 100 switches the sorting destination and sorts the packet data into the high-frequency band LTE transferring buffer 121 (S44).

In this case, for example, the base station 100 has judged that since the available wireless resource amount of the low-frequency band becomes less than or equal to the threshold value while the low-frequency band is better in communication quality than the high-frequency band, it is difficult to transmit using the wireless resource of the low-frequency band. In this case, the base station switches the sorting destination to the high-frequency band LTE transferring buffer 121, and transmits packet data using the wireless resource of the high-frequency band.

For example, when the queue length information from the low-frequency band LTE transferring buffer 120 exceeds the queue length reference value, the first comparison unit 1013-1 outputs the judgment result thereof to the sorting destination switching unit 1015. Based on such a judgment result, the sorting destination switching unit 1015 sets the sorting destination to the high-frequency band LTE transferring buffer 121.

In addition, the processing proceeds to S41, and the base station 100 repeats the above-mentioned processing.

On the other hand, when the error occurrence rate of the high-frequency band is not higher than the error occurrence rate of the low-frequency band (S42: N) and the queue length of the high-frequency band LTE transferring buffer 121 does not exceed the reference value (S45: N), the base station 100 sorts packet data into the high-frequency band LTE transferring buffer 121 on a priority basis (S44).

In this case, for example, the base station 100 has judged that the high-frequency band is better in communication quality than the low-frequency band and it is possible to transmit packet data using the wireless resource of the high-frequency band.

In addition, the processing proceeds to S41, and the base station 100 repeats the above-mentioned processing.

On the other hand, when the queue length of the high-frequency band exceeds the reference value (S45:Y), the base station 100 sorts packet data into the low-frequency band LTE transferring buffer 120 (S46).

In this case, for example, the base station 100 has judged that since an available wireless resource amount on the high-frequency band side becomes less than or equal to the threshold value while the high-frequency band is better in communication quality than the low-frequency band, it is difficult to use the wireless resource on the high-frequency band side. In this case, the base station 100 transmits packet data using a wireless resource based on the LTE on the low-frequency band side.

In addition, the processing proceeds to S41, and the base station 100 repeats the above-mentioned processing.

In the present second embodiment, for example, the base station 100 performs wireless communication on a priority basis using a wireless resource based on a frequency band whose quality is good, and as for packet data difficult to transmit using such a wireless resource, the base station 100 transmits the packet data using the other frequency band inferior in quality.

Accordingly, the base station 100 performs transmission with, for example, optimizing the use of a wireless resource in a frequency band superior in quality, and, in a case where it is difficult to perform transmission using such a wireless resource, the base station 100 uses a wireless resource based on the other frequency band, and optimizes the use of both the wireless resources. Therefore, in the present third embodiment, it is possible to achieve the effective utilization of a wireless resource.

In addition, the base station 100 performs transmission with, for example, optimizing the use of a wireless resource in a frequency band superior in quality. Therefore, compared with a case where a portion of a wireless resource based on such a frequency band becomes redundant, in the present third embodiment, it is possible to achieve the effective utilization of a wireless resource.

Furthermore, since the base station 100 performs transmission using, for example, the other frequency band superior in quality on a priority basis, the likelihood that retransmission is performed is also decreased compared with a case where transmission is performed using only one frequency band. Accordingly, in the present third embodiment, it is also possible to achieve the improvement of a throughput.

<Another Example in Third Embodiment>

Figure 17:
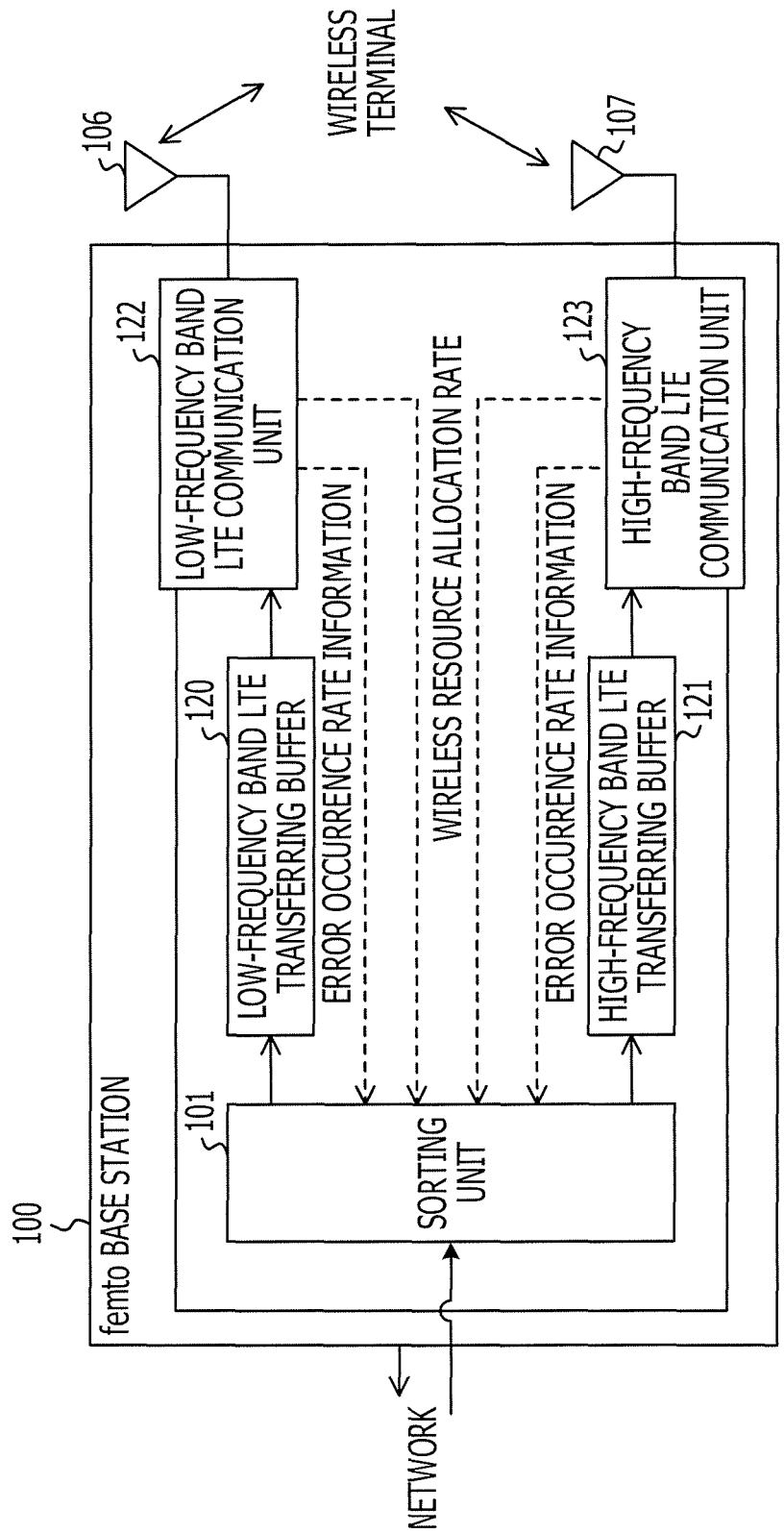
FIG. 17 is a diagram illustrating an example of a configuration of a base station.
Figure 18:
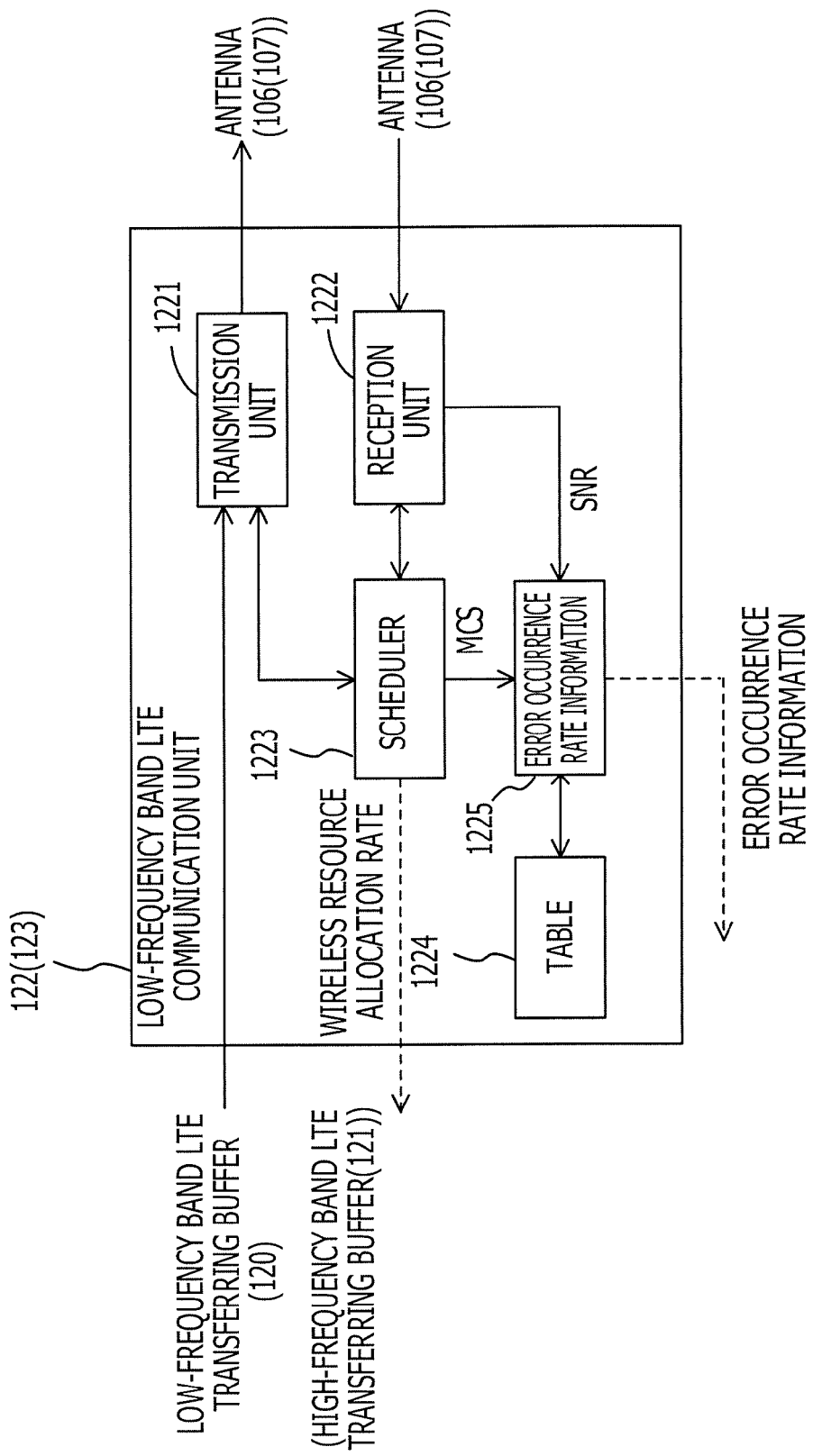
FIG. 18 is a diagram illustrating an example of a configuration of a low-frequency band LTE communication unit.
Figure 19:
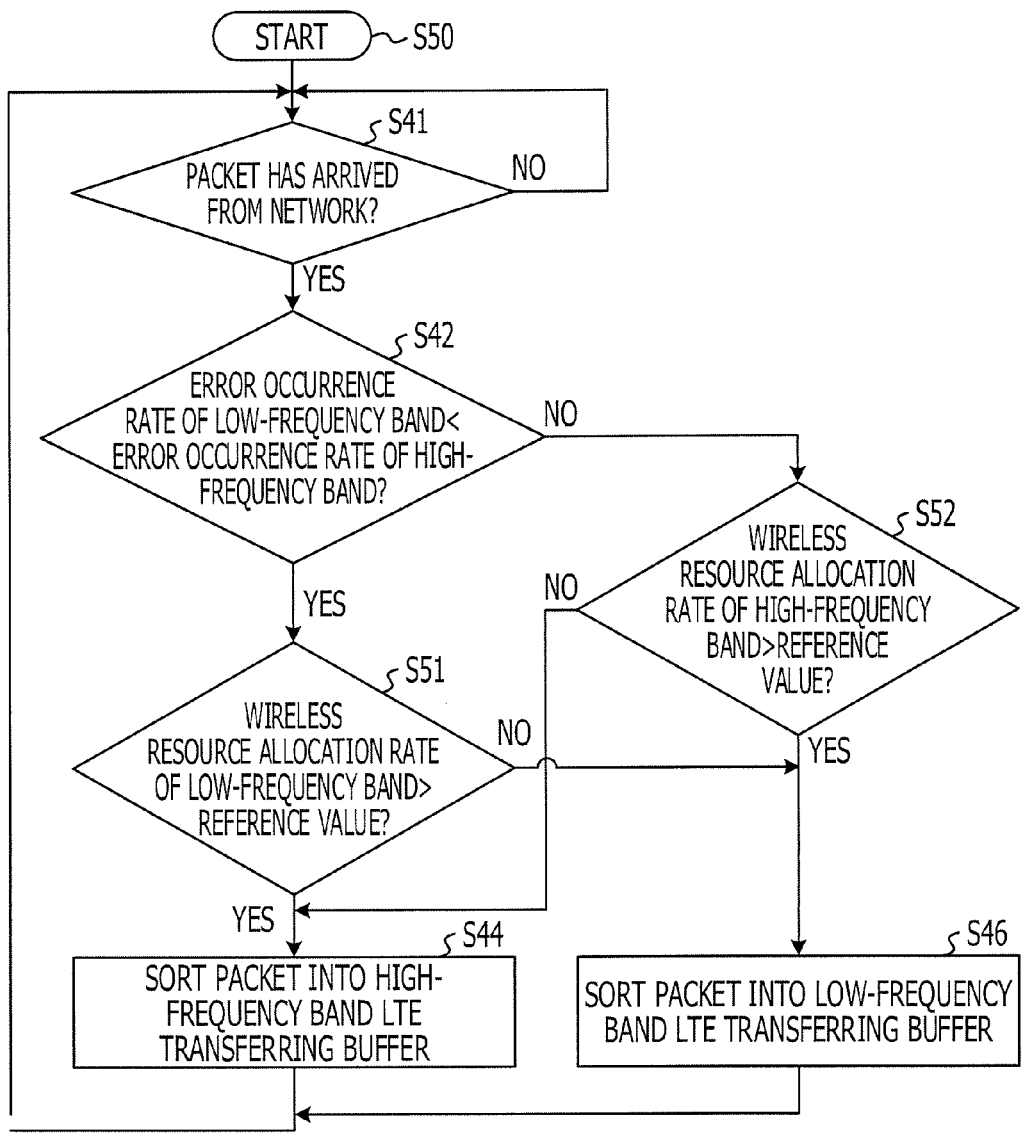
FIG. 19 is a flowchart illustrating an example of an operation of sorting processing.

Next, another example in the third embodiment will be described. FIG. 17 to FIG. 19 are diagrams for explaining the other example. In the above-mentioned example, an example has been described where packet data sorted into one frequency band on a priority basis is switched to the other frequency band, based on the queue length information. In the present example, an example will be described where sorting is switched based on a wireless resource allocation rate.

FIG. 17 is an example of the configuration of the base station 100 in the present example. The low-frequency band LTE communication unit 122 calculates and outputs the wireless resource allocation rate of the low-frequency band to the sorting unit 101. The high-frequency band LTE communication unit 123 calculates and outputs the wireless resource allocation rate of the high-frequency band to the sorting unit 101.

Each of the LTE communication units 122 and 123 includes, for example, a scheduler, and allocates a wireless resource to a user (or the terminal 200) under control thereof. The wireless resource allocation rate expresses, for example, the ratio of the number of resource blocks allocated to the user to the number of resource blocks (RBs) corresponding to the amount of one wireless frame.

FIG. 18 illustrates an example of the configuration of the low-frequency band LTE communication unit 122. The scheduler 1223 allocates a wireless resource to, for example, the terminal 200 under control of the base station 100. At this time, the scheduler 1223 calculates the wireless resource allocation rate, and outputs the calculated wireless resource allocation rate to the sorting unit 101. In addition, FIG. 18 also illustrates an example of the configuration of the high-frequency band LTE communication unit 123.

FIG. 19 is a flowchart illustrating an example of an operation in the present example. For example, the flowchart is performed in the sorting unit 101 in the base station 100.

After having received packet data (S41:Y), the base station 100 judges, with respect to the error occurrence rate of the low-frequency band and the error occurrence rate of the high-frequency band, whether or not the error occurrence rate of the high-frequency band is higher than the error occurrence rate of the low-frequency band (S42).

When the error occurrence rate of the high-frequency band is higher than that of the low-frequency band (S42:Y) and the wireless resource allocation rate of the low-frequency band does not exceed a reference value (S51: N), the base station 100 sorts packet data into the low-frequency band LTE transferring buffer 120 on a priority basis (S46).

For example, the base station 100 has judged that a low-frequency band side is better in communication quality than a high-frequency band side and it is possible to transmit packet data using a wireless resource on the low-frequency band side.

On the other hand, when the wireless resource allocation rate of the low-frequency band has exceeded the reference value (S51:Y), the base station 100 sorts packet data into the high-frequency band LTE transferring buffer 121 (S44).

For example, the base station 100 has judged that since an available wireless resource amount in the low-frequency band becomes less than or equal to the threshold value while the low-frequency band is better in communication quality than the high-frequency band, it is difficult to use the wireless resource of the low-frequency band. In this case, the base station 100 sorts the packet data into the high-frequency band LTE transferring buffer 121, and transmits the packet data using the wireless resource of the high-frequency band.

In addition, when the error occurrence rate of the high-frequency band is not higher than the error occurrence rate of the low-frequency band (S42: N) and the wireless resource allocation rate of the high-frequency band does not exceed a reference value (S52: N), the base station 100 sorts packet data into the high-frequency band LTE transferring buffer 121 on a priority basis.

For example, the base station 100 has judged that the high-frequency band is better in communication quality than the low-frequency band and it is possible to transmit packet data using the wireless resource of the high-frequency band.

On the other hand, when the wireless resource allocation rate of the high-frequency band has exceeded the reference value (S52:Y), the base station 100 sorts packet data into the low-frequency band LTE transferring buffer 120 (S46).

For example, the base station 100 has judged that since an available wireless resource amount in the high-frequency band becomes less than or equal to the threshold value while the high-frequency band is better in communication quality than the low-frequency band, it is difficult to use the wireless resource of the high-frequency band. In this case, the base station 100 sorts packet data into the low-frequency band LTE transferring buffer 120, and transmits the packet data using the wireless resource of the low-frequency band.

In this way, the present base station 100 judges an available wireless resource amount using, for example, the wireless resource allocation rate in place of the queue length. Owing to the judgment based on the wireless resource allocation rate, it is possible for the base station 100 to optimize the use of the wireless resource of a frequency band side on which sorting is performed on a priority basis, and when it becomes difficult to use the wireless resource, it is possible for the base station 100 to use the wireless resource of the other frequency band. Therefore, it is possible to effectively utilize a wireless resource.

In addition, the base station 100 optimizes the use of a wireless resource on a frequency band side whose communication quality is better than the threshold value. Therefore, compared with a case where a portion of such a wireless resource is not used, it is possible to improve a throughput and effectively utilize a wireless resource.

In the above-mentioned third embodiment, a case has been described where two types of frequency band are used. As for the frequency band, for example, three or more types of frequency band may also be used examples of which include a first frequency band, a second frequency band whose frequency band is higher than the first frequency band, and a third frequency band whose frequency band is higher than the second frequency band.

In addition, also as for the wireless communication method, for example, two or more types of wireless communication method may also be used examples of which include the LTE and the WiMAX or the LTE, the WiMAX, and the 3G.

Figure 20:
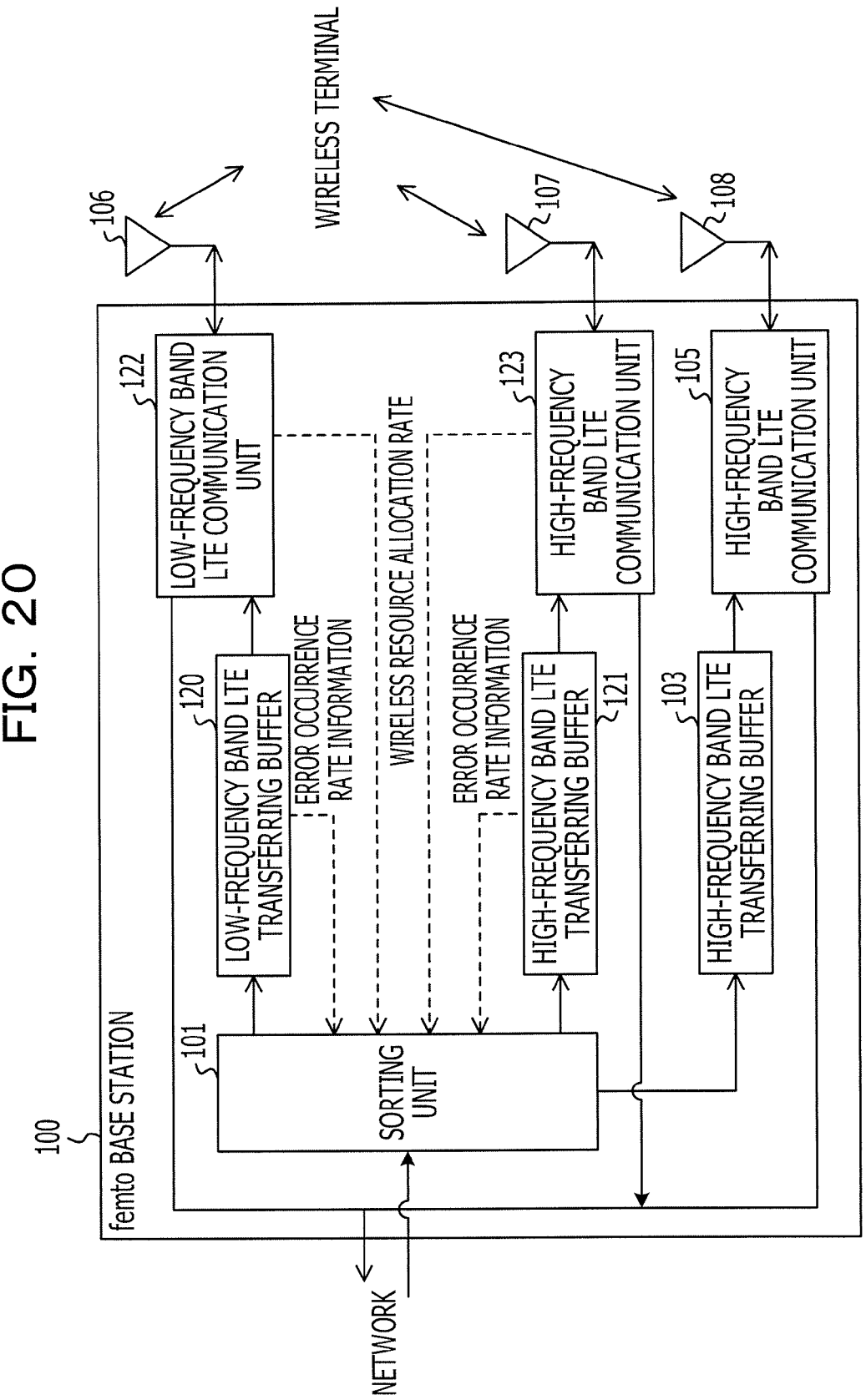
FIG. 20 is a diagram illustrating an example of a configuration of a base station.
Figure 21:
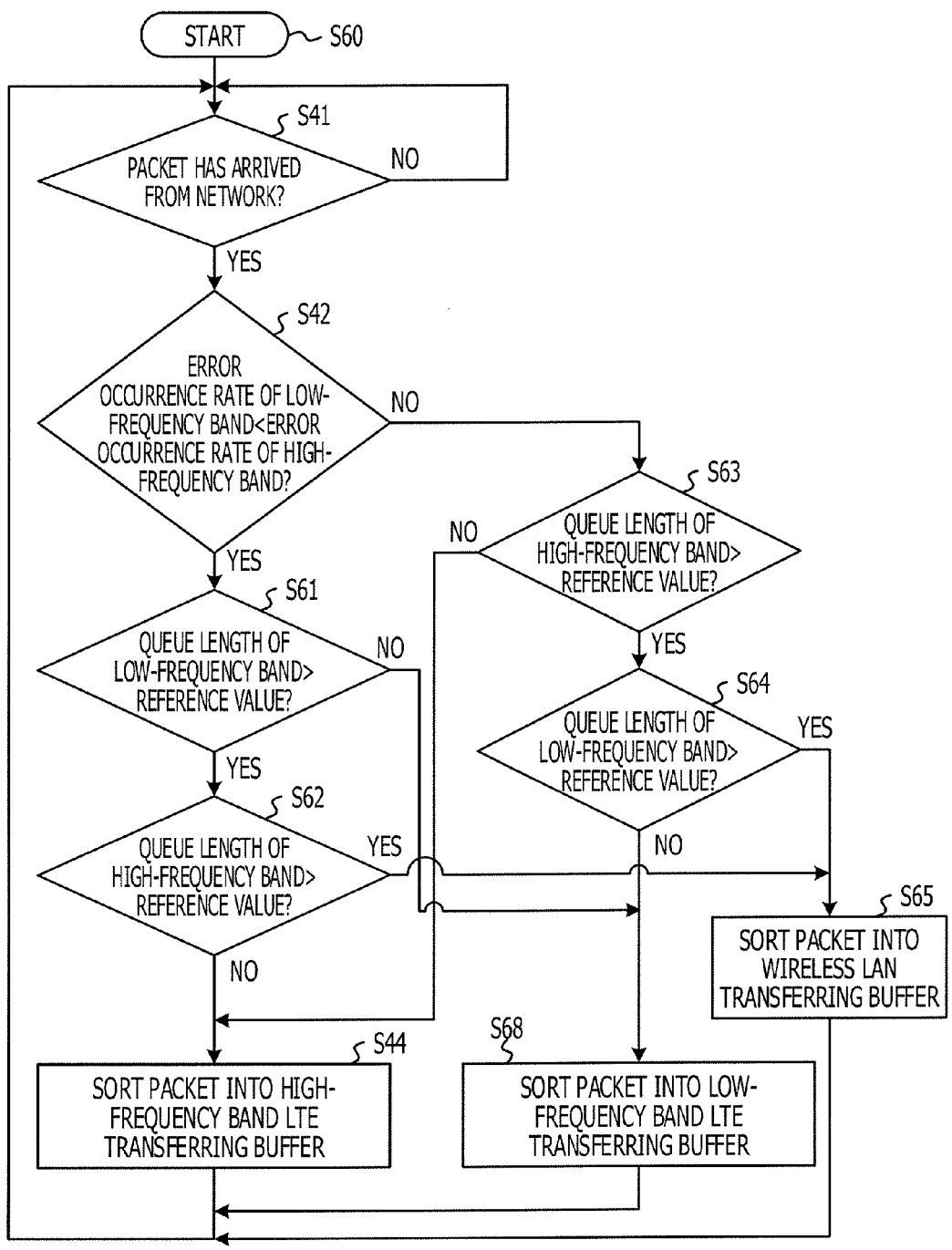
FIG. 21 is a flowchart illustrating an example of an operation of sorting processing.

Furthermore, it is also possible to implement the frequency bands and the wireless communication methods in combination. FIG. 20 illustrates an example of the configuration of the base station 100 in a case where the low-frequency band and high-frequency band of the LTE and a wireless LAN are combined. In addition, FIG. 21 expresses a flowchart illustrating an example of an operation performed in such a base station 100. The flowchart illustrated in FIG. 21 is performed in, for example, the sorting unit 101.

When the error occurrence rate of the high-frequency band is higher than the error occurrence rate of the low-frequency band (S42:Y) and the queue length of the low-frequency band does not exceed the reference value (S61: N) after packet data has been received (S41:Y), the base station 100 sorts packet data into the low-frequency band LTE transferring buffer 120 on a priority basis (S46).

In this case, for example, the base station 100 has judged that the low-frequency band is better in communication quality than the high-frequency band and it is also possible to use the wireless resource of the low-frequency band.

On the other hand, when the queue length of the low-frequency band exceeds the reference value (S61: Y) and the queue length of the high-frequency band does not exceed the reference value (S62: N), the base station 100 sorts packet data into the high-frequency band LTE transfer buffer 121.

In this case, for example, the base station 100 judges that the available wireless resource amount of the low-frequency band becomes less than or equal to the threshold value and it is difficult to use such a wireless resource, switches the sorting destination, and sorts packet data into the high-frequency band LTE transferring buffer 120.

In addition, when the queue length of the high-frequency band exceeds the reference value (S62: Y), the base station 100 switches the sorting destination, and sorts packet data into the wireless LAN transferring buffer 103 (S65).

In this case, for example, the base station 100 has judged that both an available wireless resource in the low-frequency band and an available wireless resource in the high-frequency band become less than or equal to the threshold values and it is difficult to use the wireless resource of the LTE. In this case, the base station 100 switches the sorting destination, and sorts packet data into the wireless LAN transferring buffer 103.

On the other hand, when the error occurrence rate of the high-frequency band is not higher than the error occurrence rate of the low-frequency band (S42: N) and the queue length of the high-frequency band does not exceed the reference value (S63: N), the base station 100 sorts packet data into the high-frequency band LTE transferring buffer 121 on a priority basis (S44).

In this case, for example, the base station 100 has judged that the high-frequency band is better in communication quality than the low-frequency band and it is possible to use the wireless resource of the high-frequency band.

On the other hand, when the queue length of the high-frequency band exceeds the reference value (S63: Y) and the queue length of the low-frequency band does not exceed the reference value (S64: N), the base station 100 sorts packet data into the low-frequency band LTE transfer buffer 120 (S46).

In this case, for example, the base station 100 has judged that since the available wireless resource amount of the high-frequency band becomes less than or equal to the threshold value while the high-frequency band is better in communication quality than the low-frequency band, it is difficult to use the wireless resource of the high-frequency band. In this case, the base station 100 switches the sorting destination, and outputs packet data into the low-frequency band transferring buffer 121.

In addition, when the queue length of the low-frequency band also exceeds the reference value (S64: Y), the base station 100 sorts packet data into the wireless LAN transferring buffer 103 (S65).

In this case, for example, the base station 100 has judged that both available wireless resources in both the high-frequency band and the low-frequency band become less than or equal to the threshold values and it is difficult to use the wireless resource of the LTE, and the base station 100 outputs packet data to the wireless LAN transferring buffer 103.

Figure 22:
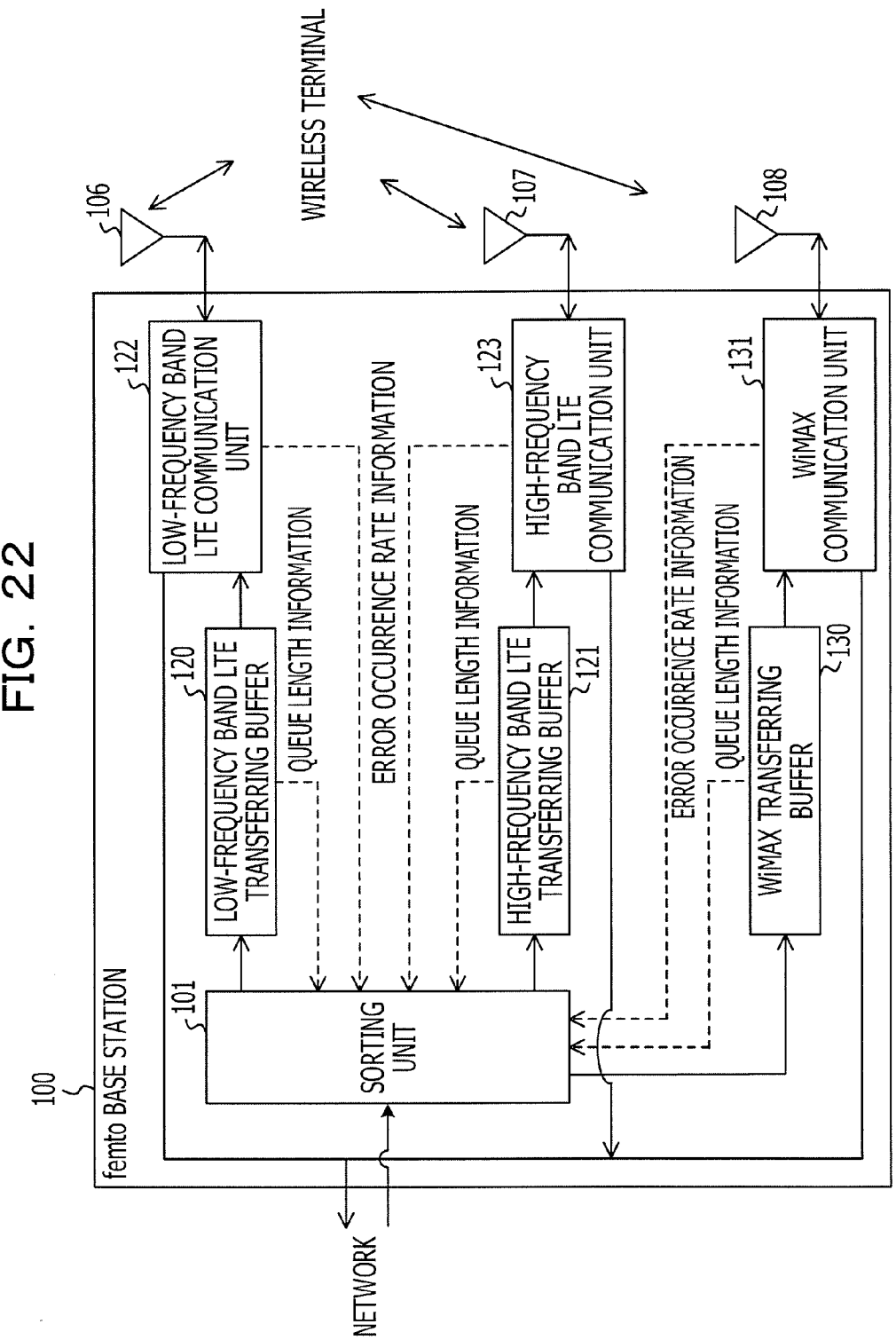
FIG. 22 is a diagram illustrating an example of a configuration of a base station.

In the same way, FIG. 22 is an example of combination, and illustrates an example of the configuration of the base station 100 in a case where the low-frequency band and high-frequency band of the LTE and the WiMAX are combined. The base station 100 further includes a WiMAX transferring buffer 130 and a WiMAX communication unit 131.

The WiMAX transferring buffer 130 stores therein, for example, packet data received from a network, and the stored packet data is arbitrarily read out by the WiMAX communication unit 131. An example of the configuration of the WiMAX transferring buffer 130 is illustrated in FIG. 5 in the same way as, for example, the low-frequency band LTE transferring buffer 120 or the like.

The WiMAX communication unit 131 performs wireless communication with the terminal 200 via the antenna 108 in accordance with a wireless communication method standardized by, for example, IEEE802.16e or the like. Also in the WiMAX, in the same way as the case of the LTE, the transmission of packet data is performed using a wireless resource subjected to scheduling by a scheduler or the like and reserved. An example of the configuration of the WiMAX communication unit 131 is also illustrated in, for example, FIG. 14. In this case, the transmission unit 1221 and the reception unit 1222 perform wireless communication using the above-mentioned wireless communication method.

An example of the operation of the base station 100 illustrated in FIG. 22 may be performed by, for example, replacing S65 in FIG. 21 with sorting a packet into the WiMAX transferring buffer 130.

As illustrated in FIG. 20 to FIG. 22, the combination of two or more types of wireless communication method and two or more types of frequency band may also be implemented. In this case, the base station 100 transmits data using, on a priority basis, a frequency band whose communication quality is good or a wireless communication method for which a wireless resource is reserved. In addition, when a wireless resource amount available in such transmission becomes less than or equal to a threshold value, the base station 100 switches to a frequency band whose communication quality is not good or a wireless communication method in which a wireless resource is shared with another base station.

Accordingly, since the use of a wireless communication method for which a wireless resource is reserved is optimized, it is possible for the base station 100 to effectively utilize the wireless resource. In addition, since the use of a frequency band whose communication quality is good or a wireless communication method for which a wireless resource is reserved is optimized, the base station is also able to secure a desired throughput, and able to achieve the improvement of the throughput, compared with a case where only a portion thereof is used.

In addition, in the above-mentioned third embodiment, the sorting unit 101 sorts packet data with prioritizing a wireless communication method based on the LTE of one frequency band superior in communication quality, based on, for example, the error occurrence rate information. For example, the sorting unit 101 may also sort packet data into a frequency band side superior in communication quality, using, without change, quality information transmitted from the terminal 200. In this case, the low-frequency band LTE communication 122 and the high-frequency band LTE communication unit 123 output, to the sorting unit 101, the quality information transmitted from the terminal 200. The quality information may also be, for example, an index value such as a channel quality indicator (CQI).

Fourth Embodiment

Next, a fourth embodiment will be described. In the fourth embodiment, for example, an example of application in a case where a priority order is assigned to each terminal 200 or flow will be described.

Figure 23:
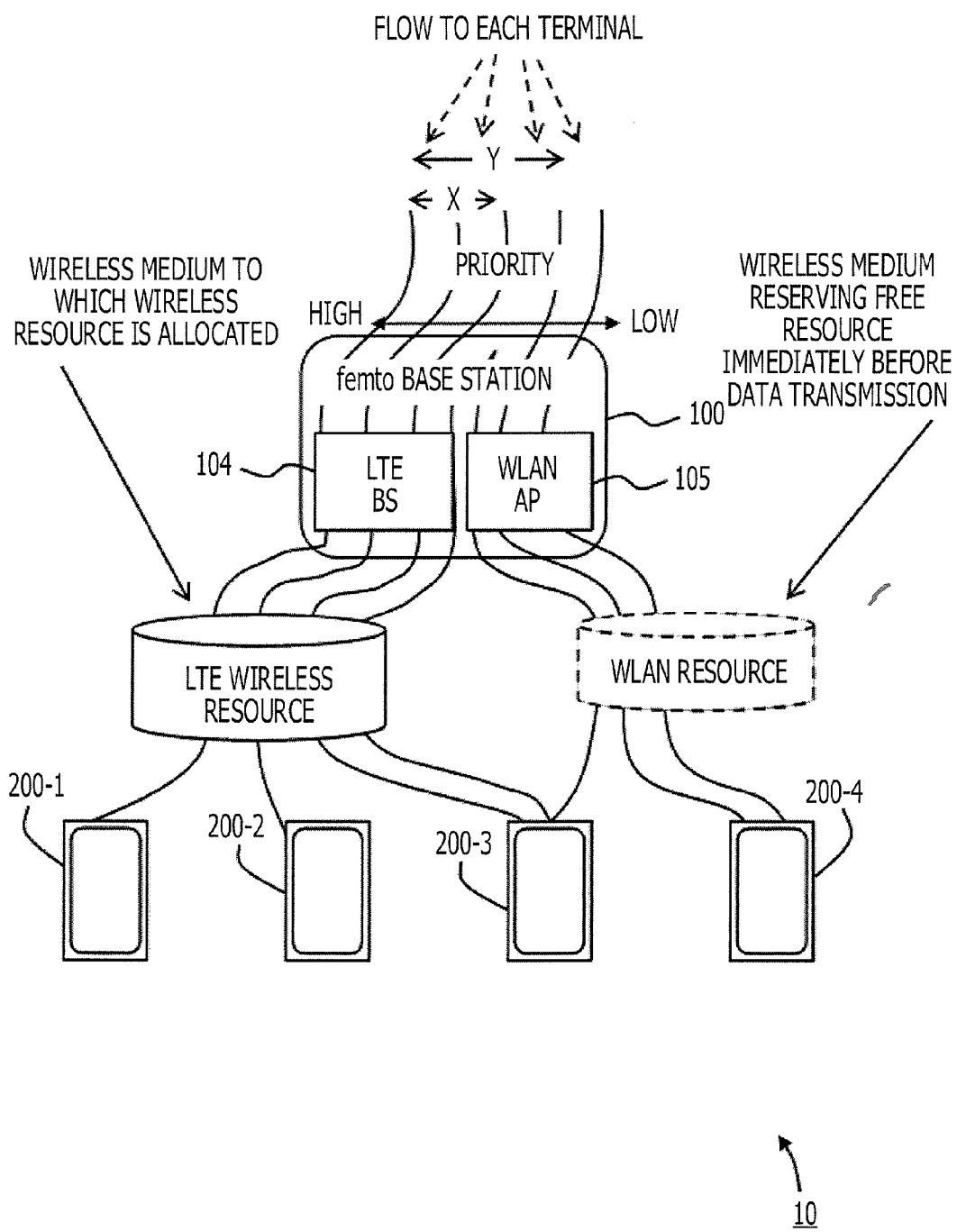
FIG. 23 is a diagram illustrating an example of a configuration of a wireless communication system and an example of a flow in a wireless communication system.

FIG. 23 illustrates an example of the configuration of the wireless communication system 10 and an example of how a flow is transmitted to the terminal 200 in the present fourth embodiment. The flow means, for example, communication performed for each application or service. As examples of the flow, the flow of a voice call, the flow of video distribution, the flow of a Web, the flow of a file transfer protocol (FTP), and so forth may be cited. In what follows, an example of a case where a priority order is assigned to each flow will be described.

As illustrated in FIG. 23, a priority is assigned to each flow. For example, the flow of a voice call has the highest priority, and a priority decreases in order of the flow of video distribution, the flow of a Web, and the flow of a FTP.

In the present fourth embodiment, individual flows are grouped based on priority orders, and with respect to a group (hereinafter, referred to as, for example, a flow set in some cases) including one flow or a plurality of flows whose priorities are higher than that of a flow including the self-packet, communication is performed using the LTE. For example, wireless communication utilizing the LTE is performed with the individual flows of a voice call and video distribution as a flow set having a higher priority.

In addition, in a case where the wireless resource of the LTE become insufficient with respect to a flow set including a flow including received packet data, wireless communication is performed using the LTE, with respect to a flow set whose priority is higher than that of the flow set including the received packet data. With respect to a flow set other than the high priority, communication is performed using, for example, a wireless LAN.

For example, in a case where packet data relating to the flow of a Web has been received, communication based on the LTE is performed with respect to packet data relating to the flows of a voice call and video distribution serving as a flow set whose priority is higher than the flow of a Web. In this case, with respect to packet data relating to the Web flow, wireless communication based on the wireless LAN is performed.

Figure 24:
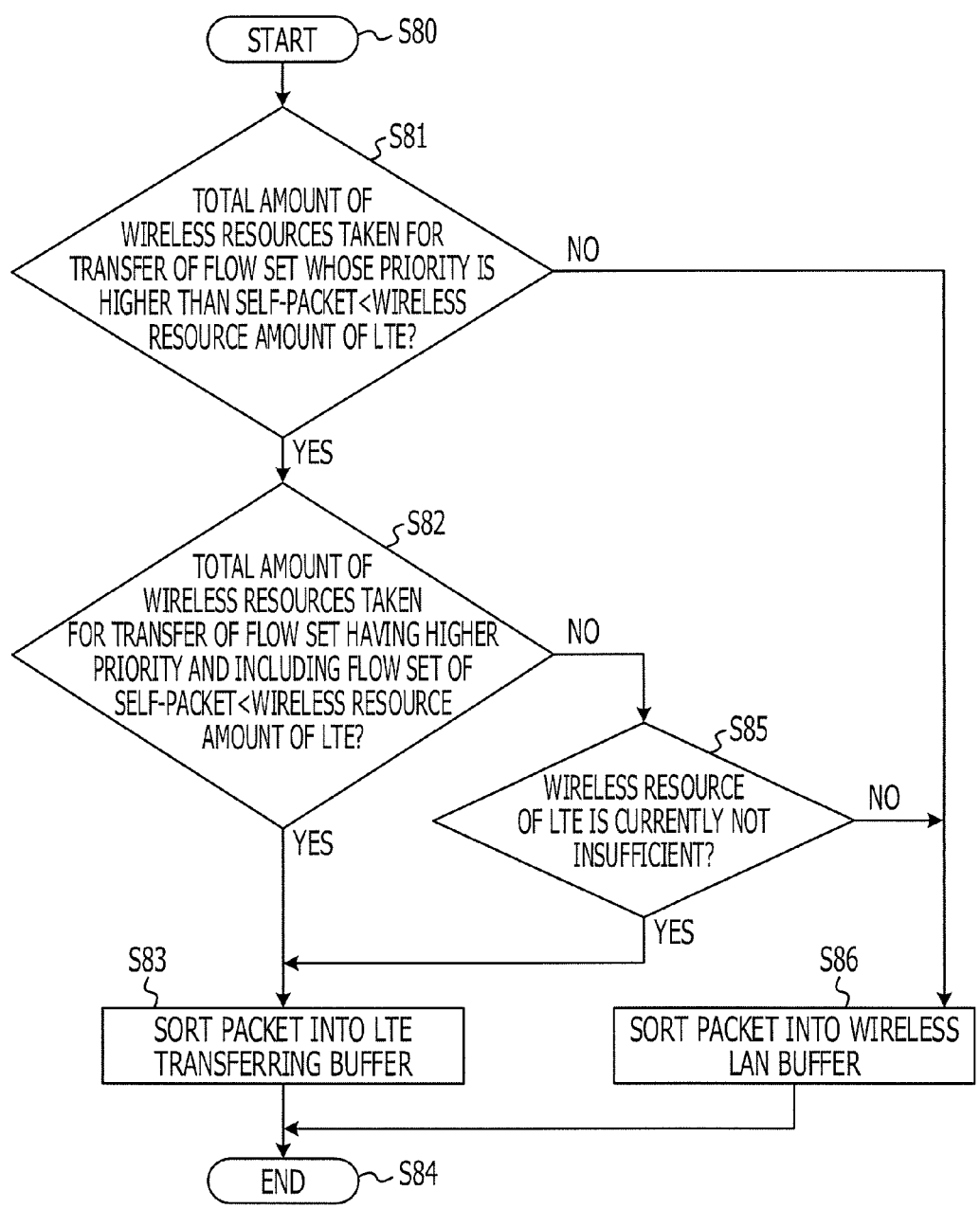
FIG. 24 is a flowchart illustrating an example of an operation of sorting processing.

FIG. 24 is a flowchart illustrating an example of an operation in the present fourth embodiment. In this regard, however, an example of the configuration of the base station 100 in the present fourth embodiment is illustrated in, for example, FIG. 3.

When having started the present processing (S80), the base station 100 receives packet data, and further receives packet data included in a flow set whose priority is higher than the former packet data.

For example, the base station 100 receives packet data relating to a Web flow, and also receives packet data relating to each of the flows of a voice call and video distribution included in a group set whose priority is higher than the former packet data.

Next, the base station 100 judges whether or not the total amount of wireless resources taken for the transfer of a flow set whose priority is higher than the self-packet data is smaller than the wireless resource amount of the LTE (S81).

For example, the total amount of wireless resources taken for the transfer of a flow set whose priority is higher than the self-packet data is indicated by "X" in FIG. 23. The "X" expresses, for example, the sum of the individual flows of a voice call and video distribution.

In the process in S81, for example, the sorting unit 101 judges whether or not it is possible to transmit a group whose priority is higher than the reception packet data using the wireless resource of the LTE. By calculating, for example, a wireless resource amount corresponding to the data amount of packet data included in a flow set whose priority is higher than the flow including the reception packet data and comparing with a wireless resource amount used for the LTE and acquired from the LTE communication unit 104, it is possible for the sorting unit 101 to perform processing.

When the total amount of wireless resources taken for the transfer of a flow set whose priority is higher than the self-packet data is smaller than the wireless resource amount of the LTE (S81: Y), the base station 100 judges whether or not the total amount of wireless resources for the flow set having a higher priority and including the flow set of the self-packet is lower than the wireless resource amount of the LTE (S82).

For example, the total amount of wireless resources for the flow set having a higher priority and including the flow set of the self-packet is indicated by "Y" in FIG. 23. When packet data relating to, for example, the Web flow serves as the self-packet data, the "Y" expresses the sum of the individual flows of this Web, a voice call, and video distribution.

For example, by calculating a wireless resource amount corresponding to the data amount of the reception packet data, adding to the total amount of wireless resources calculated in S81, and comparing an addition value with a wireless resource amount used for the LTE and acquired from the LTE communication unit 104, the sorting unit 101 performs processing.

When the total amount of wireless resources for the flow set having a higher priority and including the flow set of the self-packet is lower than the wireless resource amount of the LTE (S82: Y), the base station 100 sorts, into the LTE transferring buffer 102, the received self-packet data and packet data included in the flow set having a higher priority (S83). In addition, the base station 100 terminates a series of processes (S84).

In this case, for example, the base station 100 has judged that it is possible to transmit all of the self-packet and packets belonging to the flow set having a higher priority, using the wireless resource of the LTE.

On the other hand, when the total amount of wireless resources for the flow set having a higher priority and including the flow set of the self-packet is not lower than the wireless resource amount of the LTE (S82: N), the base station 100 judges whether or not the wireless resource of the LTE is insufficient (S85).

In addition, when there is a remainder in the wireless resource of the LTE (S85: Y), the base station 100 transmits packet data included in the flow set having a higher priority, using the wireless resource of the LTE (S83).

In this case, for example, the base station 100 transmits packet data belonging to the flow set having a higher priority, using the wireless resource of the LTE.

In addition, when the wireless resource of the LTE is insufficient (or there in no free wireless resource) (S85: N), the base station 100 transmits the self-packet and packet data included in the flow set having a higher priority, using the wireless LAN (S86).

In this case, for example, if there is no remainder in the wireless resource of the LTE, the base station 100 transmits the self-packet using a wireless resource based on the wireless LAN.

Furthermore, in a case where it is difficult to transmit all packet data included in the flow set having a higher priority using the wireless resource of the LTE even if there is a remainder in the wireless resource of the LTE, the base station 100 transmits such packet data difficult to transmit and the self-packet data, using the wireless LAN (S86).

In this case, while, for example, the base station 100 transmits packet data belonging to the flow set having a higher priority using the wireless resource of the LTE on a priority basis, the base station 100 transmits, using the wireless resource of the wireless LAN, packet data, which belongs to the flow set having a higher priority and is difficult to transmit using only the wireless resource of the LTE. In addition, the base station 100 also transmits the self-packet using the wireless resource of the wireless LAN.

In addition, the base station 100 terminates a series of processes (S84).

In the present fourth embodiment, for example, the packet data of a flow set having a higher priority is transmitted on a priority basis, using a wireless communication method for which a wireless resource is reserved. In this case, the packet data of a flow set, difficult to transfer using only such a wireless resource, is transmitted using a wireless communication method for which a wireless resource shared with wireless communication based on another base station is used.

Accordingly, in the present fourth embodiment, in the same way as the second embodiment, since the use of a wireless communication method for which a wireless resource is reserved is optimized, it is possible to effectively utilize the wireless resource. In addition, in the present fourth embodiment, since the use of a wireless resource based on a frequency band whose communication quality is good or a wireless communication method for which a wireless resource is reserved is optimized, it is possible to achieve the improvement of the throughput, compared with a case where only a portion thereof is used.

Another Embodiment

Figure 25:
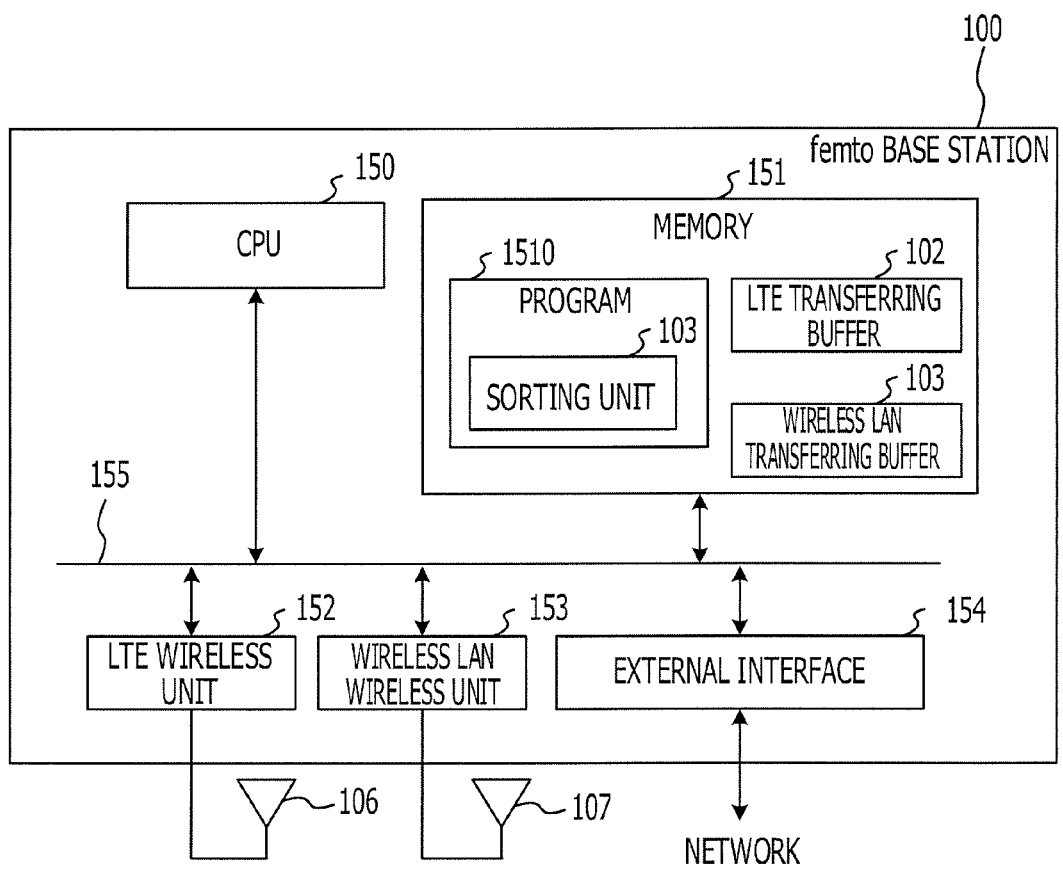
FIG. 25 is a diagram illustrating an example of a configuration of a base station.

Next, another embodiment will be described. FIG. 25 is a diagram illustrating an example of a configuration relating to the hardware of the base station 100.

The base station 100 further includes a central processing unit (CPU) 150, a memory 151, an LTE wireless unit 152, a wireless LAN wireless unit 153, and an external interface 154, and these are connected to one another via a bus 155.

By reading out a program 1510 stored in the memory 151 and executing such a program 1510, the CPU 150 executes, for example, the function of the sorting unit 101. The CPU 150 corresponds to, for example, the sorting unit 101 in the second to fourth embodiments.

In addition, the CPU 150 stores packet data after sorting, in the LTE transferring buffer 102 or the wireless LAN transferring buffer 103 within the memory 151. Furthermore, the CPU 150 reads out packet data stored in one of the two buffers 102 and 103, performs thereon error correction encoding processing, modulation processing, and so forth, and individually outputs packet data after the modulation processing, to the LTE wireless unit 152 or the wireless LAN wireless unit 153. The CPU 150 corresponds to, for example, a portion of the LTE communication unit 104 or the wireless LAN communication unit 105 in the second to fourth embodiments. In this case, the CPU 150 allocates a wireless resource by performing scheduling on the packet data read out from the LTE transferring buffer 102. The CPU 150 corresponds to, for example, the schedulers 1041 and 1223 in the second and third embodiments.

In addition to the program 1510, the memory 151 includes the LTE transferring buffer 102 and the wireless LAN transferring buffer 103. The memory 151 corresponds to, for example, the LTE transferring buffer 102 and the wireless LAN transferring buffer 103 in the second to fourth embodiments.

The LTE wireless unit 152 performs frequency conversion processing and so forth on, for example, the packet data after the modulation processing, output from the CPU 150, converts the packet data after the modulation processing into a wireless signal, and outputs the wireless signal after conversion, to the terminal 200 via the antenna 106.

The wireless LAN wireless unit 153 performs frequency conversion processing and so forth, for example, on the packet data after the modulation processing, output from the CPU 150, converts the packet data after the modulation processing into a wireless signal, and outputs the wireless signal after conversion, to the terminal 200 via the antenna 107.

The external interface 154 is connected to an external device via, for example, a network, and extracts and outputs packet data from data of a predetermined format, input from the network, and to the CPU 150. In addition, the external interface 154 converts data output from, for example, the CPU 150 into data of a predetermined format, and outputs the data to the network.

In any one of the above-mentioned examples, the LTE has been cited an example and described, for example, as a wireless communication method in a case where packet data is transmitted using a wireless resource reserved based on scheduling. The WiMAX, a high speed downlink packet access (HSDPA), or the like may also be used if being a wireless communication method in which transmission is performed using a reserved wireless resource.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless station comprising:
   a transmitter configured to transmit data to a terminal device by at least one of a first wireless communication method using a first wireless resource reserved for the wireless station, the first wireless communication method using a second wireless resource reserved for the wireless station and being a different frequency band from the first wireless resource, and a second wireless communication method using at least one of a third wireless resource shared with another wireless station in wireless communication with another terminal device, and a fourth wireless resource reserved for the wireless station, wherein the fourth wireless resource is different than the first, the second, and the third wireless resource; and
   a processor coupled to the transmitter and configured to:
      perform transmission of the data by the first wireless communication method using the first wireless resource prioritized over at least one of the first wireless communication method using the second wireless resource and the second wireless communication method, and
      perform, when the remaining first wireless resource has become less than or equal to a first threshold value, transmission of the data by the at least one of the first wireless communication method using the second wireless resource and the second wireless communication method.

2. The wireless station according to claim 1, wherein the processor is configured to:
   prioritize the first wireless communication method using the first wireless resource that is superior to the first wireless communication method using the second wireless resource in communication quality between the terminal device and the wireless station,
   perform transmission of the data by the prioritized first wireless communication method using the first wireless resource, and
   perform, when the remaining first wireless resource has become less than or equal to the first threshold value, transmission of the data by the first wireless communication method using the second wireless resource.

3. The wireless station according to claim 1, wherein the transmitter is configured to transmit the data to the terminal device by at least one of the first wireless communication method using the first wireless resource, the first wireless communication method using the second wireless resource, and the second wireless communication method using the third wireless resource shared with another wireless station in wireless communication with another terminal device, and
   the processor is configured to:
      perform transmission of the data by the prioritized first wireless communication method using the first wireless resource, perform, when the remaining first wireless resource has become less than or equal to the first threshold value, transmission of the data by the first wireless communication method using the second wireless resource, and perform, when the remaining second wireless resource has become less than or equal to a second threshold value, transmission of the data by the second wireless communication method using the third wireless resource.

4. The wireless station according to claim 1, wherein the transmitter is configured to transmit the data to the terminal device by at least one of the first wireless communication method using the first wireless resource, the first wireless communication method using the second wireless resource, and the second wireless communication method using the fourth wireless resource reserved for the wireless station, and the processor is configured to:

perform transmission of the data by the prioritized first wireless communication method using the first wireless resource, perform, when the remaining first wireless resource has become less than or equal to the first threshold value, transmission of the data by the first wireless communication method using the second wireless resource, and perform, when the remaining second wireless resource has become less than or equal to a third threshold value, transmission of the data by the second wireless communication method using the fourth wireless resource.

5. The wireless station according to claim 1, wherein the transmitter is configured to transmit the data to the terminal device by at least one of the first wireless communication method using the first wireless resource, and the second wireless communication method using the fourth wireless resource reserved for the wireless station, and the processor is configured to:

prioritize the first wireless communication method using the first wireless resource superior to the second wireless communication method using the fourth wireless resource in communication quality between the terminal device and the wireless station, perform transmission of the data by the prioritized first wireless communication method using the first wireless resource, and perform, when the remaining first wireless resource has become less than or equal to the first threshold value, transmission of the data by the second wireless communication method using the fourth wireless resource.

6. The wireless station according to claim 1, further comprising:

a first buffer configured to store therein data to be transmitted by the first wireless communication method using the first wireless resource, wherein the processor is configured to judge, based on an amount of the data stored in the first buffer, whether or not the remaining first wireless resource becomes less than or equal to the first threshold value.

7. The wireless station according to claim 1, wherein the processor is configured to:

determine, in transmitting the data by the first wireless communication method using the first wireless resource, an encoding rate and a modulation method for the data, calculate a data rate corresponding to the determined encoding rate and modulation method, and judge, based on the calculated data rate, whether or not the remaining first wireless resource becomes less than or equal to the first threshold value.

8. The wireless station according to claim 7, wherein the processor is configured to:

calculate, based on an amount of data stored in a second buffer, a first time taken before the data stored in the second buffer is transmitted to the terminal device by the first wireless communication method using the first wireless resource, and judge, based on whether or not a time obtained by adding the first time to a second time exceeds a fourth threshold value, whether or not the remaining first wireless resource becomes less than or equal to the first threshold value, the second time being taken before data corresponding to an amount of one packet is transmitted and being calculated based on the calculated data rate.

9. The wireless station according to claim 2, further comprising:

a receiver configured to receive communication quality information relating to the communication quality and being transmitted from the terminal device, wherein the processor is configured to:

determine an encoding rate and a modulation method for data to be transmitted to the terminal device by the first wireless communication method using the first wireless resource, generate error information, based on the communication quality information, the encoding rate, and the modulation method, and judge, based on the error information, that the first wireless communication method using the first wireless resource is superior to the first wireless communication method using the second wireless resource in the communication quality.

10. The wireless station according to claim 1, wherein the processor is configured to:

allocate the first wireless resource to the terminal device, calculate an allocation rate indicating a ratio of the number of resource blocks to which the first wireless resource is allocated to a given number of resource blocks serving as an allocation target of the first wireless resource, and judge, based on the allocation rate, whether or not the remaining first wireless resource becomes less than or equal to the first threshold value.

11. The wireless station according to claim 1, wherein the processor is configured to:

perform transmission of the data belonging to a second flow whose priority is higher than a first flow, by the first wireless communication method using the first wireless resource, each flow of the first and second flows indicating communication performed with respect to each service provided to the terminal device, and perform transmission of the data belonging to the first flow, by the second wireless communication method using the third wireless resource shared with another wireless station in wireless communication with another terminal device.

12. The wireless station according to claim 11, wherein the processor is configured to:

perform transmission of the data belonging to the second flow, by the first wireless communication method using the first wireless resource, when the remaining first wireless resource is greater than or equal to the first threshold value even if the first wireless resource is used for the data belonging to the second flow, and perform, when the remaining first wireless resource has become less than or equal to the first threshold value, transmission of the data belonging to the second flow by the second wireless communication method using the third wireless resource.

13. A data transmission method comprising:

transmitting data from a wireless station to a terminal device by at least one of a first wireless communication method using a first wireless resource reserved for the wireless station, the first wireless communication method using a second wireless resource reserved for the wireless station and being a different frequency band from the first wireless resource, and a second wireless communication method using at least one of a third wireless resource shared with another wireless station in wireless communication with another terminal device, and a fourth wireless resource reserved for the wireless station, wherein the fourth wireless resource is different than the first, the second, and the third wireless resource;

performing transmission of the data by the first wireless communication method using the first wireless resource prioritized over at least one of the first wireless communication method using the second wireless resource and the second wireless communication method; and performing by a processor, when the remaining first wireless resource has become less than or equal to a first threshold value, transmission of the data by the at least one of the first wireless communication method using the second wireless resource and the second wireless communication method.

14. A wireless communication system comprising:

a terminal device configured to receive data; and a wireless station configured to:

transmit the data to the terminal device by at least one of a first wireless communication method using a first wireless resource reserved for the wireless station, the first wireless communication method using a second wireless resource reserved for the wireless station and being a different frequency band from the first wireless resource, and a second wireless communication method using at least one of a third wireless resource shared with another wireless station in wireless communication with another terminal device, and a fourth wireless resource reserved for the wireless station, wherein the fourth wireless resource is different than the first, the second, and the third wireless resource, perform transmission of the data by the first wireless communication method using the first wireless resource prioritized over at least one of the first wireless communication method using the second wireless resource and the second wireless communication method, and perform, when the remaining first wireless resource has become less than or equal to a first threshold value, transmission of the data by the at least one of the first wireless communication method using the second wireless resource and the second wireless communication method.

\* \* \* \* \*